US012701583B2

(12) United States Patent
Xu et al.

(10) Patent No.: US 12,701,583 B2
(45) Date of Patent: Aug. 4, 2026

(54) TECHNIQUES FOR PHYSICAL UPLINK CONTROL CHANNEL ADAPTATION

(71) Applicant: QUALCOMM Incorporated, San Diego, CA (US)

(72) Inventors: Huilin Xu, Temecula, CA (US); Ahmed Elshafie, San Diego, CA (US); Hung Dinh Ly, San Diego, CA (US); Diana Maamari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 579 days.

(21) Appl. No.: 18/194,279

(22) Filed: Mar. 31, 2023

(65) Prior Publication Data

US 2024/0334451 A1    Oct. 3, 2024

(51) Int. Cl.
| | |
|---|---|
| *H04W 72/232* | (2023.01) |
| *H04L 5/00* | (2006.01) |
| *H04W 52/02* | (2009.01) |
| *H04W 72/0446* | (2023.01) |
| *H04W 72/21* | (2023.01) |

(52) U.S. Cl.
CPC ......... *H04W 72/232* (2023.01); *H04L 5/0078* (2013.01); *H04W 52/0203* (2013.01); *H04W 72/21* (2023.01); *H04W 72/0446* (2013.01)

(58) Field of Classification Search
CPC ........... H04W 72/232; H04W 52/0203; H04W 72/21; H04W 72/0446; H04W 72/23; H04L 5/0078; H04L 5/0094; H04L 5/0053
See application file for complete search history.

(56) References Cited

U.S. PATENT DOCUMENTS

| | | | | |
|---|---|---|---|---|
| 6,643,259 B1 * | 11/2003 | Borella | ................. | H04L 47/193 |
| | | | | 370/231 |
| 6,876,639 B1 * | 4/2005 | Cao | ........................ | H04L 69/163 |
| | | | | 370/428 |

(Continued)

OTHER PUBLICATIONS

International Search Report and Written Opinion—PCT/US2024/018695—ISA/EPO—May 31, 2024.

(Continued)

*Primary Examiner* — Ayaz R Sheikh
*Assistant Examiner* — Tarell A Hampton
(74) *Attorney, Agent, or Firm* — Holland & Hart LLP/QUALCOMM Incorporated

(57) ABSTRACT

Methods, systems, and devices for wireless communications are described. A user equipment (UE) and network entity may perform physical uplink control channel (PUCCH) resource adaptation in order for the network entity to reduce power consumption. For example, the UE may receive first control signaling indicating a first set of PUCCH resource occasions and a second set of PUCCH resource occasions, and transmit one or more uplink messages via the first set of PUCCH resource occasions. In some examples, the UE and the network entity may switch between operating using the first set of PUCCH resource occasions to operating using the second set of PUCCH resource occasions based on second control signaling indicating for the UE to switch between sets of PUCCH resource occasions. In some examples, the second control signaling may indicate for the UE to skip one or more uplink messages or PUCCH resource occasions.

22 Claims, 17 Drawing Sheets

(56) References Cited

U.S. PATENT DOCUMENTS

| | | | | |
|---|---|---|---|---|
| 7,058,027 | B1* | 6/2006 | Alessi | H04L 1/0068 |
| | | | | 370/310.1 |
| 10,638,463 | B2* | 4/2020 | Park | H04W 72/21 |
| 11,395,321 | B2* | 7/2022 | Tesanovic | H04W 72/21 |
| 2009/0241004 | A1* | 9/2009 | Ahn | H04L 12/1868 |
| | | | | 714/776 |
| 2011/0280206 | A1* | 11/2011 | Johansson | H04W 72/20 |
| | | | | 370/329 |
| 2015/0098406 | A1* | 4/2015 | Miao | H04W 72/21 |
| | | | | 370/329 |
| 2020/0221444 | A1* | 7/2020 | Tiirola | H04W 72/21 |
| 2022/0022219 | A1 | 1/2022 | Liu et al. | |
| 2022/0123896 | A1* | 4/2022 | Taherzadeh Boroujeni | |
| | | | | H04L 5/0055 |
| 2023/0068143 | A1* | 3/2023 | Vobilishetti | H04W 72/542 |
| 2023/0076577 | A1* | 3/2023 | Li | H04L 1/1861 |
| 2023/0198682 | A1* | 6/2023 | Khoshnevisan | H04L 5/0053 |
| | | | | 370/329 |
| 2023/0299929 | A1* | 9/2023 | Gou | H04L 5/0055 |
| | | | | 370/329 |
| 2023/0345465 | A1* | 10/2023 | Fakoorian | H04W 72/1268 |
| 2023/0354341 | A1* | 11/2023 | Huang | H04W 72/231 |
| 2023/0362939 | A1* | 11/2023 | Lidian | H04L 5/006 |
| 2024/0015577 | A1* | 1/2024 | Kang | H04W 28/0231 |
| 2024/0260025 | A1* | 8/2024 | Sanders | H04W 72/20 |
| 2025/0023611 | A1* | 1/2025 | Jeon | H04B 7/0626 |

OTHER PUBLICATIONS

Moderator (Intel Corporation): "Discussion Summary #2 for energy saving techniques of NW energy saving SI", R1-2210349, 3rd Generation Partnership Project, Mobile Competence Centre, 650, Route Des Lucioles, F-06921 Sophia-antipolis Cedex, France, vol. RAN WG1, No. e-Meeting, Oct. 10, 2022-Oct. 19, 2022, Oct. 18, 2022, 298 Pages, XP052259816.

VIVO: "Discussion on XR-awareness", R2-2207756, 3rd Generation Partnership Project, Mobile Competence Centre, 650, Route Des Lucioles, F-06921 Sophia-antipolis Cedex, France, vol. RAN WG2, No. Electronic, Aug. 17, 2022-Aug. 26, 2022, Aug. 10, 2022, 12 Pages, XP052261073.

* cited by examiner

Second Control Signaling

Second Control Signaling or PUCCH Transmission

Third Control Signaling

PUCCH Transmission

PUCCH Set 305-a

PUCCH Set 305-b

Third Control Signaling or Expiration of Timer

300

PUCCH Set 405-a                    PUCCH Set 405-b                    PUCCH Set 405-a

PUCCH Resource Occasions 410

Second Control Signaling 415

400

Receiver

610

Communications Manager

620

Transmitter

615

605

600

1010                1020                1015

1005

1000

130

105

115

Network
Entity

Transceiver

1310

Antenna

1315

Communications
Manager

1320

Memory

Code

1330

1325

1340

Processor

1335

1305

1300

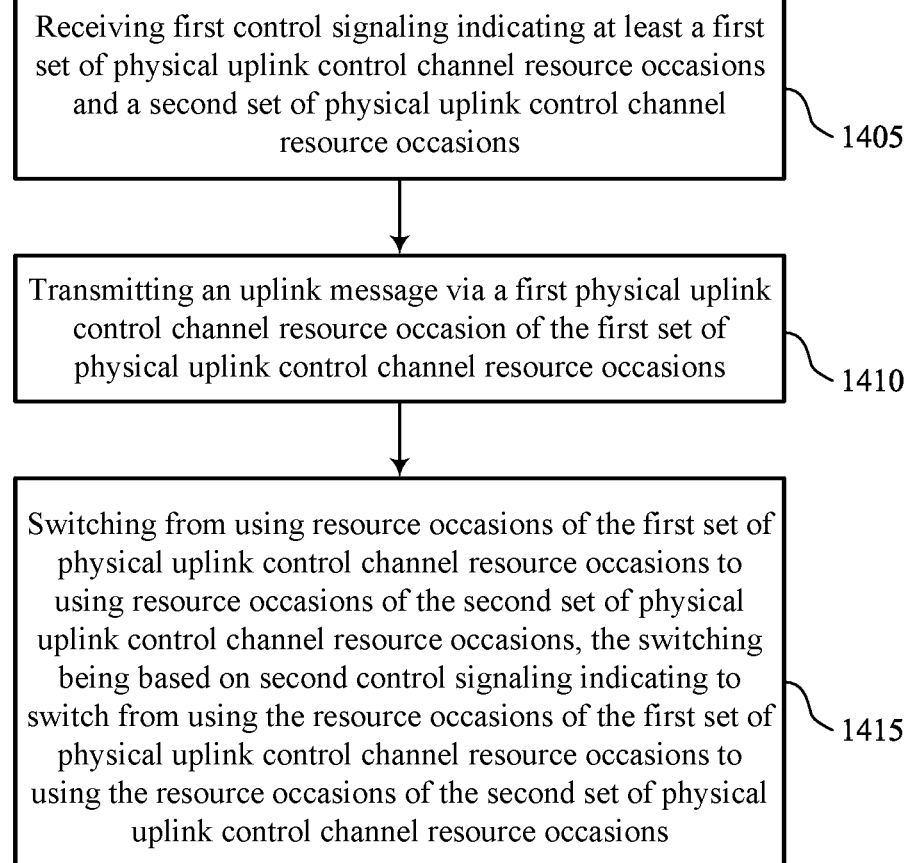

Receiving first control signaling indicating at least a first set of physical uplink control channel resource occasions and a second set of physical uplink control channel resource occasions

1405

Transmitting an uplink message via a first physical uplink control channel resource occasion of the first set of physical uplink control channel resource occasions

1410

Switching from using resource occasions of the first set of physical uplink control channel resource occasions to using resource occasions of the second set of physical uplink control channel resource occasions, the switching being based on second control signaling indicating to switch from using the resource occasions of the first set of physical uplink control channel resource occasions to using the resource occasions of the second set of physical uplink control channel resource occasions

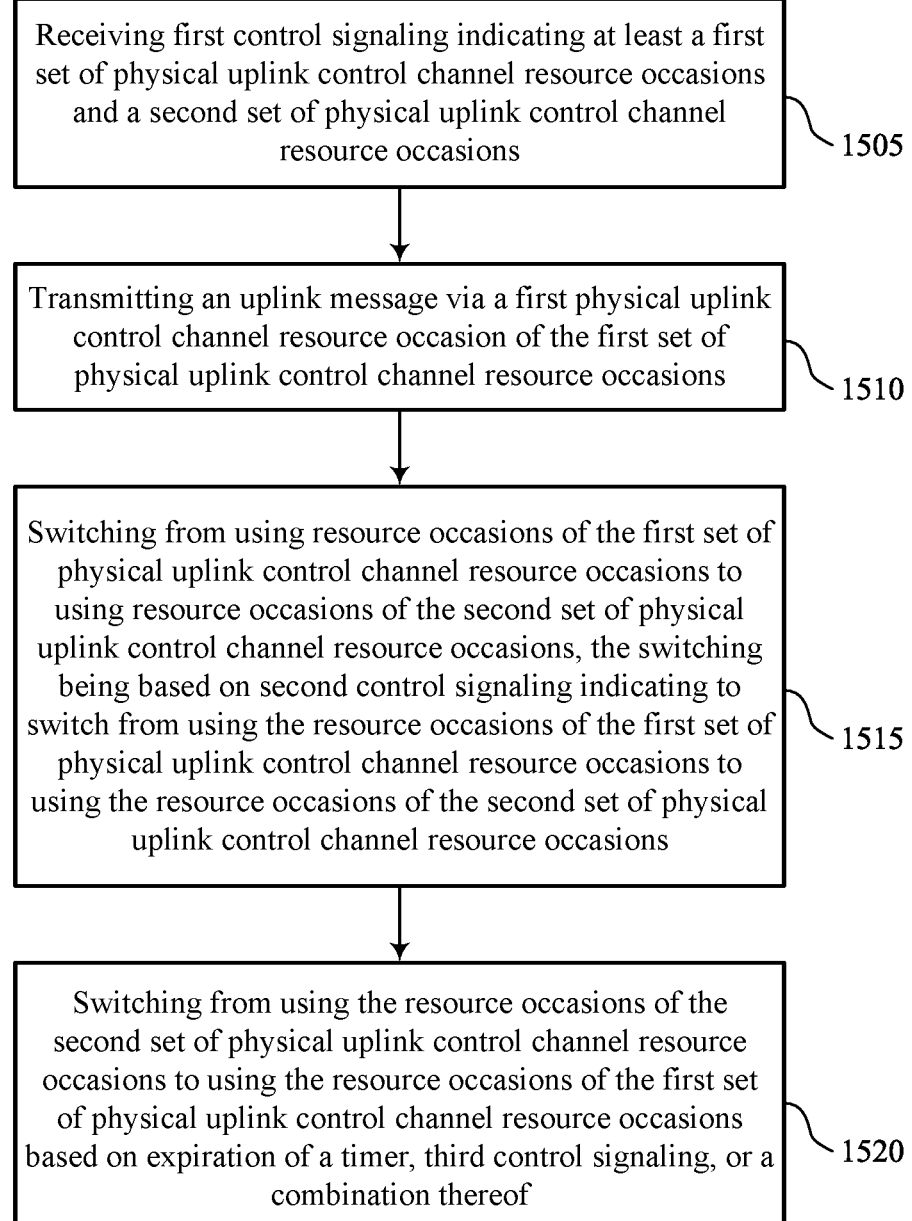

Receiving first control signaling indicating at least a first set of physical uplink control channel resource occasions and a second set of physical uplink control channel resource occasions

1505

Transmitting an uplink message via a first physical uplink control channel resource occasion of the first set of physical uplink control channel resource occasions

1510

Switching from using resource occasions of the first set of physical uplink control channel resource occasions to using resource occasions of the second set of physical uplink control channel resource occasions, the switching being based on second control signaling indicating to switch from using the resource occasions of the first set of physical uplink control channel resource occasions to using the resource occasions of the second set of physical uplink control channel resource occasions

1515

Switching from using the resource occasions of the second set of physical uplink control channel resource occasions to using the resource occasions of the first set of physical uplink control channel resource occasions based on expiration of a timer, third control signaling, or a combination thereof

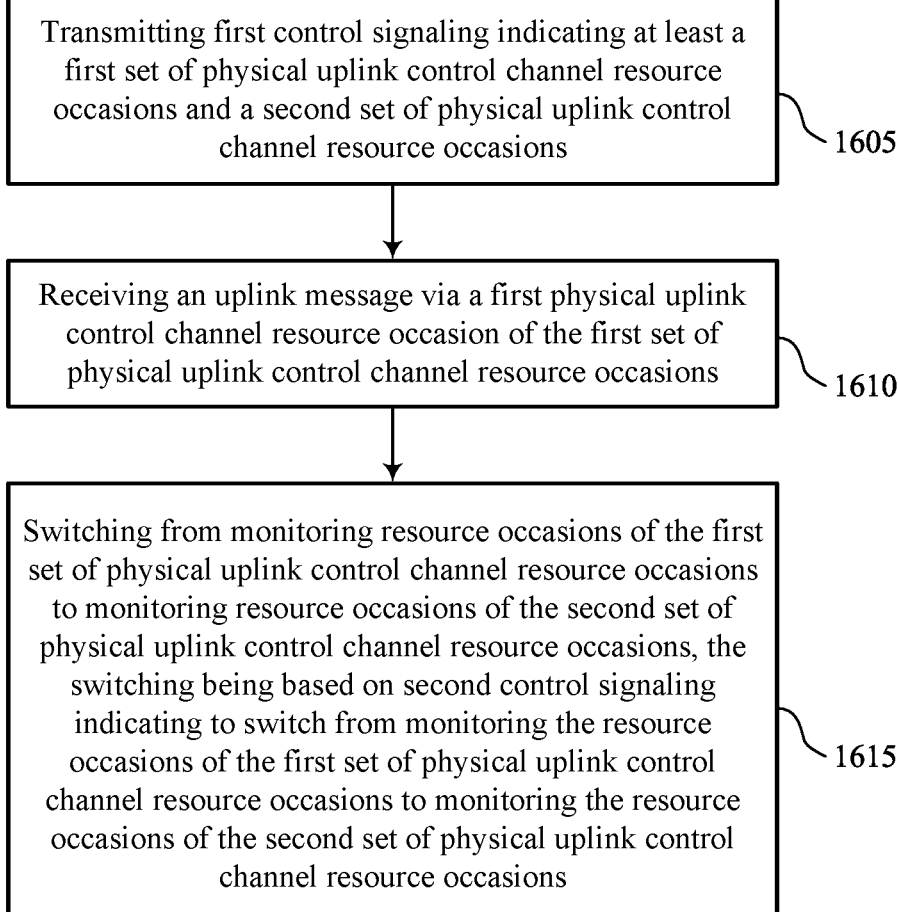

Transmitting first control signaling indicating at least a first set of physical uplink control channel resource occasions and a second set of physical uplink control channel resource occasions

1605

Receiving an uplink message via a first physical uplink control channel resource occasion of the first set of physical uplink control channel resource occasions

1610

Switching from monitoring resource occasions of the first set of physical uplink control channel resource occasions to monitoring resource occasions of the second set of physical uplink control channel resource occasions, the switching being based on second control signaling indicating to switch from monitoring the resource occasions of the first set of physical uplink control channel resource occasions to monitoring the resource occasions of the second set of physical uplink control channel resource occasions

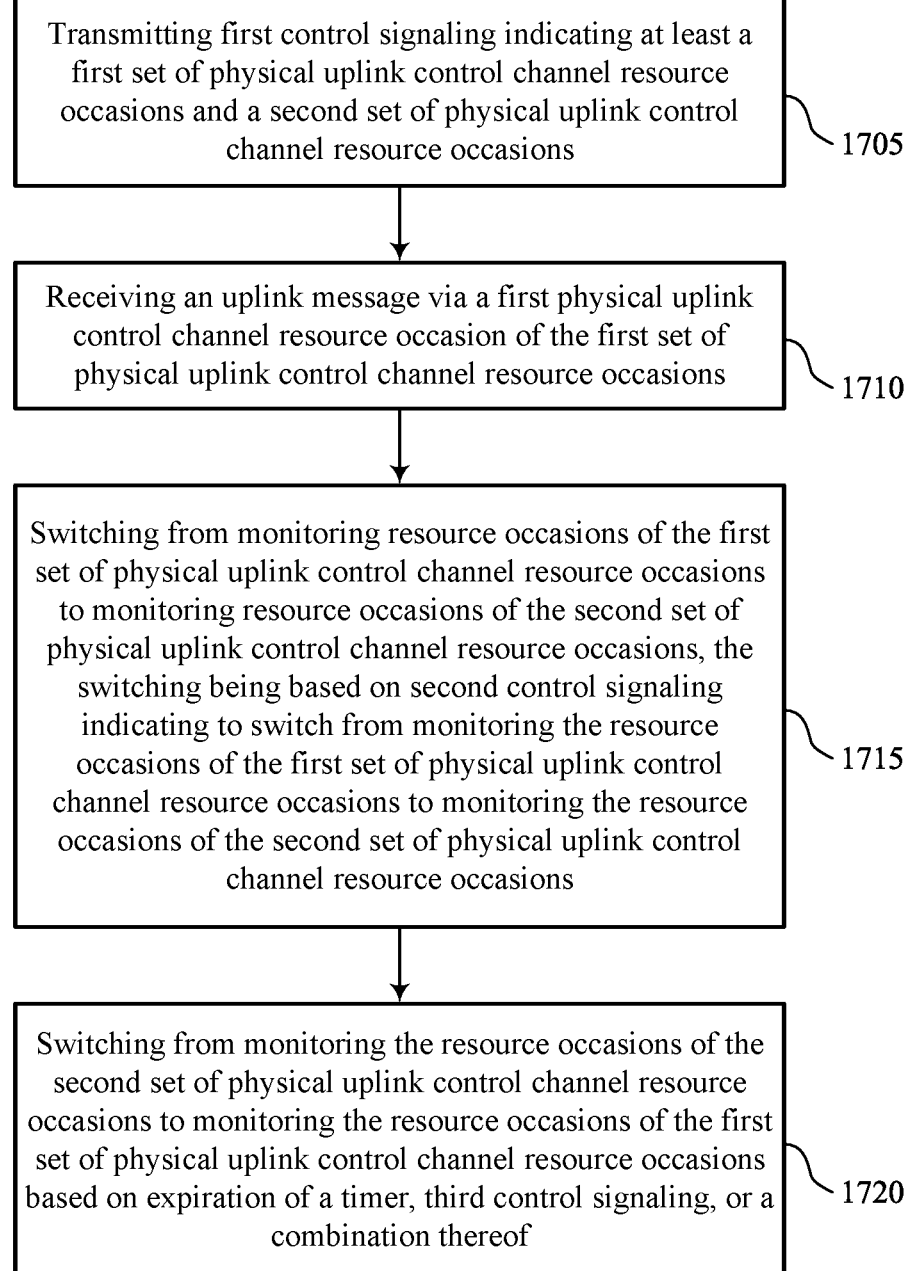

Transmitting first control signaling indicating at least a first set of physical uplink control channel resource occasions and a second set of physical uplink control channel resource occasions ⟩ 1705

Receiving an uplink message via a first physical uplink control channel resource occasion of the first set of physical uplink control channel resource occasions ⟩ 1710

Switching from monitoring resource occasions of the first set of physical uplink control channel resource occasions to monitoring resource occasions of the second set of physical uplink control channel resource occasions, the switching being based on second control signaling indicating to switch from monitoring the resource occasions of the first set of physical uplink control channel resource occasions to monitoring the resource occasions of the second set of physical uplink control channel resource occasions ⟩ 1715

Switching from monitoring the resource occasions of the second set of physical uplink control channel resource occasions to monitoring the resource occasions of the first set of physical uplink control channel resource occasions based on expiration of a timer, third control signaling, or a combination thereof ⟩ 1720

TECHNIQUES FOR PHYSICAL UPLINK CONTROL CHANNEL ADAPTATION

FIELD OF DISCLOSURE

The present disclosure, for example, relates to wireless communication systems, more particularly to techniques for physical uplink control channel adaptation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for physical uplink control channel (PUCCH) adaptation. For example, the described techniques provide for a user equipment (UE) to switch between operating using a first set of PUCCH resource occasions to operating using a second set of PUCCH resource occasions, such that a network entity may reduce power consumption during a network energy saving mode.

A method for wireless communications at a UE is described. The method may include receiving first control signaling indicating at least a first set of PUCCH resource occasions and a second set of PUCCH resource occasions, transmitting an uplink message via a first PUCCH resource occasion of the first set of PUCCH resource occasions, and switching from using resource occasions of the first set of PUCCH resource occasions to using resource occasions of the second set of PUCCH resource occasions, the switching being based on second control signaling indicating to switch from using the resource occasions of the first set of PUCCH resource occasions to using the resource occasions of the second set of PUCCH resource occasions.

An apparatus for wireless communications at a UE is described. The apparatus may include a processor, memory coupled with the processor, and instructions stored in the memory. The instructions may be executable by the processor to cause the apparatus to receive first control signaling indicating at least a first set of PUCCH resource occasions and a second set of PUCCH resource occasions, transmit an uplink message via a first PUCCH resource occasion of the first set of PUCCH resource occasions, and switch from using resource occasions of the first set of PUCCH resource occasions to using resource occasions of the second set of PUCCH resource occasions, the switching being based on second control signaling indicating to switch from using the resource occasions of the first set of PUCCH resource occasions to using the resource occasions of the second set of PUCCH resource occasions.

Another apparatus for wireless communications at a UE is described. The apparatus may include means for receiving first control signaling indicating at least a first set of PUCCH resource occasions and a second set of PUCCH resource occasions, means for transmitting an uplink message via a first PUCCH resource occasion of the first set of PUCCH resource occasions, and means for switching from using resource occasions of the first set of PUCCH resource occasions to using resource occasions of the second set of PUCCH resource occasions, the switching being based on second control signaling indicating to switch from using the resource occasions of the first set of PUCCH resource occasions to using the resource occasions of the second set of PUCCH resource occasions.

A non-transitory computer-readable medium storing code for wireless communications at a UE is described. The code may include instructions executable by a processor to receive first control signaling indicating at least a first set of PUCCH resource occasions and a second set of PUCCH resource occasions, transmit an uplink message via a first PUCCH resource occasion of the first set of PUCCH resource occasions, and switch from using resource occasions of the first set of PUCCH resource occasions to using resource occasions of the second set of PUCCH resource occasions, the switching being based on second control signaling indicating to switch from using the resource occasions of the first set of PUCCH resource occasions to using the resource occasions of the second set of PUCCH resource occasions.

Some examples of the method, apparatuses, and non-transitory computer-readable medium described herein may further include operations, features, means, or instructions for transmitting a second uplink message via a PUCCH resource occasion of the second set of PUCCH resource occasions in accordance with a threshold time offset between the second control signaling and transmitting the second uplink message.

Some examples of the method, apparatuses, and non-transitory computer-readable medium described herein may further include operations, features, means, or instructions for resetting a duration of a timer based on transmission of the second uplink message via the PUCCH resource occasion of the second set of PUCCH resource occasions, where using the resource occasions of the second set of PUCCH resource occasions may be for the duration of the timer.

Some examples of the method, apparatuses, and non-transitory computer-readable medium described herein may further include operations, features, means, or instructions for switching from using the resource occasions of the second set of PUCCH resource occasions to using the resource occasions of the first set of PUCCH resource occasions based on expiration of a timer, third control signaling, or a combination thereof.

Some examples of the method, apparatuses, and non-transitory computer-readable medium described herein may further include operations, features, means, or instructions for switching from using the resource occasions of the first set of PUCCH resource occasions to using the resource occasions of the second set of PUCCH resource occasions may be in response to transmitting the uplink message via the first PUCCH resource occasion of the first set of PUCCH resource occasions.

Some examples of the method, apparatuses, and non-transitory computer-readable medium described herein may further include operations, features, means, or instructions for transmitting uplink control information (UCI) indicating to switch from using the resource occasions of the first set of PUCCH resource occasions to using the resource occasions of the second set of PUCCH resource occasions, where the second control signaling includes the UCI.

Some examples of the method, apparatuses, and non-transitory computer-readable medium described herein may further include operations, features, means, or instructions for receiving downlink control information (DCI) indicating to switch from using the resource occasions of the first set of PUCCH resource occasions to using the resource occasions of the second set of PUCCH resource occasions, where the second control signaling includes the DCI.

Some examples of the method, apparatuses, and non-transitory computer-readable medium described herein may further include operations, features, means, or instructions for receiving DCI indicating to switch from using resource occasions of a first set of physical downlink control channel (PDCCH) resource occasions to using resource occasions of a second set of PDCCH resource occasions, where the switching may be based on receiving the DCI, the second control signaling including the DCI.

In some examples of the method, apparatuses, and non-transitory computer-readable medium described herein, the second set of PUCCH resource occasions includes an empty set, and the switching may be further based on the second control signaling indicating for the UE to skip one or more uplink messages.

Some examples of the method, apparatuses, and non-transitory computer-readable medium described herein may further include operations, features, means, or instructions for switching to the second set of PUCCH resource occasions including the empty set may be further based on a PUCCH format of the one or more uplink messages.

In some examples of the method, apparatuses, and non-transitory computer-readable medium described herein, the second control signaling indicates a duration of a timer associated with operating in the second set of PUCCH resource occasions including the empty set, and operating in the second set of PUCCH resource occasions including the empty set may be for the duration of the timer.

Some examples of the method, apparatuses, and non-transitory computer-readable medium described herein may further include operations, features, means, or instructions for switching to operating in the second set of PUCCH resource occasions including the empty set may be in accordance with a threshold time offset from the second control signaling.

Some examples of the method, apparatuses, and non-transitory computer-readable medium described herein may further include operations, features, means, or instructions for transmitting UCI indicating that the UE may be to skip the one or more uplink messages, where the second control signaling may be the UCI.

Some examples of the method, apparatuses, and non-transitory computer-readable medium described herein may further include operations, features, means, or instructions for receiving DCI indicating for the UE may be to skip the one or more uplink messages, where the second control signaling may be the DCI.

Some examples of the method, apparatuses, and non-transitory computer-readable medium described herein may further include operations, features, means, or instructions for receiving DCI indicating for the UE to skip one or more resource occasions of a set of PDCCH resource occasions, where switching to operating in the second set of PUCCH resource occasions including the empty set may be based on the DCI, and where the second control signaling may be the DCI.

A method for wireless communications at a network entity is described. The method may include transmitting first control signaling indicating at least a first set of PUCCH resource occasions and a second set of PUCCH resource occasions, receiving an uplink message via a first PUCCH resource occasion of the first set of PUCCH resource occasions, and switching from monitoring resource occasions of the first set of PUCCH resource occasions to monitoring resource occasions of the second set of PUCCH resource occasions, the switching being based on second control signaling indicating to switch from monitoring the resource occasions of the first set of PUCCH resource occasions to monitoring the resource occasions of the second set of PUCCH resource occasions.

An apparatus for wireless communications at a network entity is described. The apparatus may include a processor, memory coupled with the processor, and instructions stored in the memory. The instructions may be executable by the processor to cause the apparatus to transmit first control signaling indicating at least a first set of PUCCH resource occasions and a second set of PUCCH resource occasions, receive an uplink message via a first PUCCH resource occasion of the first set of PUCCH resource occasions, and switch from monitoring resource occasions of the first set of PUCCH resource occasions to monitoring resource occasions of the second set of PUCCH resource occasions, the switching being based on second control signaling indicating to switch from monitoring the resource occasions of the first set of PUCCH resource occasions to monitoring the resource occasions of the second set of PUCCH resource occasions.

Another apparatus for wireless communications at a network entity is described. The apparatus may include means for transmitting first control signaling indicating at least a first set of PUCCH resource occasions and a second set of PUCCH resource occasions, means for receiving an uplink message via a first PUCCH resource occasion of the first set of PUCCH resource occasions, and means for switching from monitoring resource occasions of the first set of PUCCH resource occasions to monitoring resource occasions of the second set of PUCCH resource occasions, the switching being based on second control signaling indicating to switch from monitoring the resource occasions of the first set of PUCCH resource occasions to monitoring the resource occasions of the second set of PUCCH resource occasions.

A non-transitory computer-readable medium storing code for wireless communications at a network entity is described. The code may include instructions executable by a processor to transmit first control signaling indicating at least a first set of PUCCH resource occasions and a second set of PUCCH resource occasions, receive an uplink message via a first PUCCH resource occasion of the first set of PUCCH resource occasions, and switch from monitoring resource occasions of the first set of PUCCH resource occasions to monitoring resource occasions of the second set of PUCCH resource occasions, the switching being based on second control signaling indicating to switch from monitoring the resource occasions of the first set of PUCCH resource occasions to monitoring the resource occasions of the second set of PUCCH resource occasions.

Some examples of the method, apparatuses, and non-transitory computer-readable medium described herein may further include operations, features, means, or instructions for receiving a second uplink message via a PUCCH resource occasion of the second set of PUCCH resource occasions in accordance with a threshold time offset between the second control signaling and monitoring the first PUCCH resource occasion for the second uplink message.

Some examples of the method, apparatuses, and non-transitory computer-readable medium described herein may further include operations, features, means, or instructions for resetting a duration of a timer based on reception of the second uplink message via the PUCCH resource occasion of the second set of PUCCH resource occasions, where monitoring the resource occasions of the second set of PUCCH resource occasions may be for the duration of the timer.

Some examples of the method, apparatuses, and non-transitory computer-readable medium described herein may further include operations, features, means, or instructions for switching from monitoring the resource occasions of the second set of PUCCH resource occasions to monitoring the resource occasions of the first set of PUCCH resource occasions based on expiration of a timer, third control signaling, or a combination thereof.

Some examples of the method, apparatuses, and non-transitory computer-readable medium described herein may further include operations, features, means, or instructions for switching from monitoring the resource occasions of the first set of PUCCH resource occasions to monitoring the resource occasions of the second set of PUCCH resource occasions may be in response to receiving the uplink message via the first PUCCH resource occasion of the first set of PUCCH resource occasions.

Some examples of the method, apparatuses, and non-transitory computer-readable medium described herein may further include operations, features, means, or instructions for receiving UCI indicating to switch from monitoring the resource occasions of the first set of PUCCH resource occasions to monitoring the resource occasions of the second set of PUCCH resource occasions, where the second control signaling includes the UCI.

Some examples of the method, apparatuses, and non-transitory computer-readable medium described herein may further include operations, features, means, or instructions for transmitting DCI indicating to switch from monitoring the resource occasions of the first set of PUCCH resource occasions to monitoring the resource occasions of the second set of PUCCH resource occasions, where the second control signaling includes the DCI.

Some examples of the method, apparatuses, and non-transitory computer-readable medium described herein may further include operations, features, means, or instructions for transmitting DCI indicating to switch from monitoring resource occasions of a first set of PDCCH resource occasions to monitoring resource occasions of a second set of PDCCH resource occasions, where the switching may be based on receiving the DCI, the second control signaling including the DCI.

In some examples of the method, apparatuses, and non-transitory computer-readable medium described herein, the second set of PUCCH resource occasions includes an empty set, and the switching may be further based on the second control signaling indicating for a UE to skip one or more uplink messages.

Some examples of the method, apparatuses, and non-transitory computer-readable medium described herein may further include operations, features, means, or instructions for switching to the second set of PUCCH resource occasions including the empty set may be further based on a PUCCH format associated with the one or more uplink messages.

In some examples of the method, apparatuses, and non-transitory computer-readable medium described herein, the second control signaling indicates a duration of a timer associated with operating in the second set of PUCCH resource occasions including the empty set, and operating in the second set of PUCCH resource occasions including the empty set may be for the duration of the timer.

Some examples of the method, apparatuses, and non-transitory computer-readable medium described herein may further include operations, features, means, or instructions for switching to operating in the second set of PUCCH resource occasions including the empty set may be in accordance with a threshold time offset from the second control signaling.

Some examples of the method, apparatuses, and non-transitory computer-readable medium described herein may further include operations, features, means, or instructions for receiving UCI indicating that the UE may be to skip the one or more uplink messages, where the second control signaling may be the UCI.

Some examples of the method, apparatuses, and non-transitory computer-readable medium described herein may further include operations, features, means, or instructions for transmitting DCI indicating for the UE may be to skip the one or more uplink messages, where the second control signaling may be the DCI.

Some examples of the method, apparatuses, and non-transitory computer-readable medium described herein may further include operations, features, means, or instructions for transmitting DCI indicating for the UE to skip one or more resource occasions of a set of PDCCH resource occasions, where switching to operating in the second set of PUCCH resource occasions including the empty set may be based on the DCI, and where the second control signaling may be the DCI.

BRIEF DESCRIPTION OF THE DRAWINGS

FIGS. 14 through 17 show flowcharts illustrating methods that support techniques for PUCCH adaptation in accordance with one or more aspects of the present disclosure.

DETAILED DESCRIPTION

Figure 1:
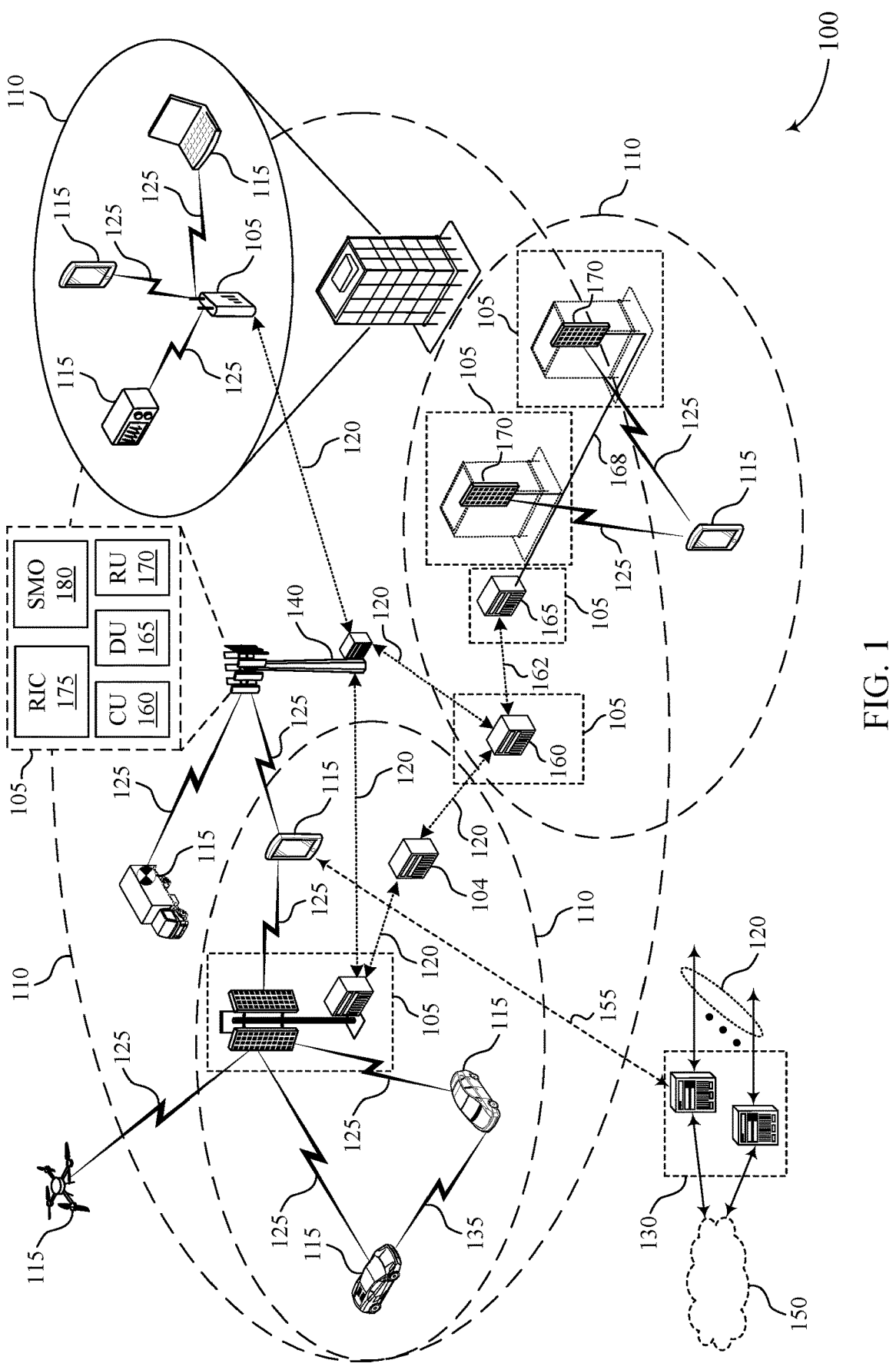
FIG. 1 shows an example of a wireless communications system that supports techniques for physical uplink control channel (PUCCH) adaptation in accordance with one or more aspects of the present disclosure.

In some wireless communications systems, a network entity may perform various operations in order to implement network energy savings (NESs). For example, the network entity may implement a cell discontinuous reception (DRX) cycle, implement a cell discontinuous transmission (DTX) cycle, among other operations to support NESs. However, to achieve a reduced amount of power consumption at the network entity, it may be desirable for the network entity to implement various resource adaptations.

The techniques described herein may enable the network entity and the UE efficiently perform physical uplink control channel (PUCCH) power adaption, which may lead to reduced power consumption at the network entity. For example, the network entity may transmit first control signaling (e.g., such as radio resource control (RRC) signaling) indicating a first set of PUCCH resource occasions and a second set of PUCCH resource occasions for use by the UE. The UE may use the resource occasions of the first set of PUCCH resource occasions to transmit one or more uplink messages, where the first set of PUCCH resource occasions may otherwise be referred to as a default set of PUCCH resource occasions. The UE may switch from using the resource occasions of the first set of PUCCH resource occasions to using resource occasions of the second set of PUCCH resource occasions based on second control signaling (e.g., downlink control information (DCI) from the network entity or uplink control information (UCI) sent from the UE).

In such examples, the first set of PUCCH resource occasions may have less resource occasions relative to those of the second set of PUCCH resource occasions, thereby enabling the network entity to conserve power while the UE is operating in the first set of PUCCH resource occasions. Alternatively, the second set of PUCCH resource occasions may have less resource occasions relative to those of the first set of PUCCH resource occasions. As such, the network entity, or UE, may indicate to switch to using the second set of PUCCH resource occasions during times when traffic between the UE and the network entity is relatively low, thereby reducing power consumption at the network entity. In some other examples, the second set of PUCCH resource occasions may be an empty set. As such, by switching from operating in the first set of PUCCH resource occasions to operating in the second set of PUCCH resource occasions, the UE may skip transmitting one or more uplink messages, thereby enabling the network entity to refrain from monitoring for such uplink messages and conserve power.

Aspects of the disclosure are initially described in the context of wireless communications systems. Aspects of the disclosure are further described in the context of a state diagram, a timing diagram, and a process flow. Aspects of the disclosure are further illustrated by and described with reference to apparatus diagrams, system diagrams, and flowcharts that relate to techniques for PUCCH adaptation.

FIG. 1 shows an example of a wireless communications system 100 that supports techniques for PUCCH adaptation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for PUCCH adaptation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

In some cases, the network entity 105 may operate in a NES mode in order to save network energy during transmission and reception of various messages with the UE 115. For example, in order to reduce power consumption, the network entity 105 may implement a cell DRX cycle (e.g., which may be defined from the perspective of the network entity 105). In such cell DRX cycles, the network entity 105 may reduce reception activities (e.g., reception of uplink messages 225) by limiting the transmission of one or more uplink messages 225 from the UE 115 to be during a cell DRX on-duration. Similarly, the network entity 105 may implement a cell DTX cycle in order to reduce transmission activities (e.g., transmission of one or more downlink messages) from the network entity 105 to the UE 115 by limiting such transmissions to be during a cell DTX on-duration, thereby reducing power consumption at the network entity.

In such cases, the UE 115 may receive an indication of the cell DRX and DTX on and off durations, such that the UE 115 may align one or more of a UE DRX cycle, a semi-persistent scheduled physical downlink shared channel (PDSCH), channel state information (CSI) reference signal (CSI-RS) reception cycle, or the like with the cell DTX and cell DRX on and off duration, such that the UE 115 may also conserver power by not activating a receiver at the UE 115.

In some cases, the network entity 105 may align the transmission and reception of a wireless transceiver of the network entity 105 in order to achieve increased power saving gains. That is, the network entity 105 may align the cell DTX cycle with the cell DRX cycle, such that the network entity 105 may experience increased power savings. For example, the network entity 105 may be able to shut off one or more components, such as a high speed clock or baseband components, when both the transmitter of the network entity 105 and the receiver of the network entity 105 are off. As such, the network entity 105 may align the cell DRX cycle and cell DTX cycle to achieve such results.

In some cases, the UE 115 and the network entity 105 may support indications of unused configured grant physical uplink shared channel (PUSCH) resources to enhance configured grants with multiple PUSCHs and reduce power consumption at the network entity 105. That is, the UE 115 and the network entity 105 may support dynamic indication of unused configured grant PUSCH resource occasions based on UCI transmitted for the UE 115 (e.g., a configured grant UCI or a UCI configured to indicate the unused PUSCH resource occasions).

For example, the network entity 105 may transmit, to the UE 115, a message that includes a configured grant for one or more PUSCH resource occasions. Such configured grant PUSCH resources may be an example of a periodic uplink transmission opportunity for the UE 115. As such, if there is uplink data in a buffer of the UE 115, the UE 115 may transmit the data via a resource occasion of the configured grant PUCCH resources (e.g., the allocated resources). The UE 115 may perform such operations in cases when the uplink data has a variable instantaneous data generation rate. Otherwise, if there is no data in the buffer of the UE 115, the UE 115 may skip, or otherwise refrain from using, the configured grant PUSCH resource occasions. In such cases, the UE may transmit, to the network entity 105, UCI indicating that the UE 115 is to skip one or more PUSCH resource occasions.

Such skipping of configured grant PUSCH resources may be optional or based on a capability of the UE 115. In some examples, the UE 115 may transmit a capability message, where the capability message includes a skipping capability parameter such as skipUplinkTxDynamic. The skipUplinkTxDynamic parameter may indicate whether the UE 115 supports skipping of uplink transmissions for an uplink grant that is indicated on a physical downlink control channel (PDCCH) if no data is available for transmission (e.g., as specified in TS 38.321 of the 3GPP standards).

However, in some examples, it may be desirable that the network entity 105 and the UE 115 implement one or more additional techniques in order to improve NES in terms of both transmission and reception at the network entity 105. For example, it may be desirable to achieve more efficient operations to dynamically, or semi-statically, and with finer granularity, adapt transmissions, receptions, or both in one or more of NES techniques in time, frequency, spatial, and power domains, with potential support and feedback from the UE 115 via potential UE assistance information. Additionally, it may be desirable to implement various techniques for information exchange (e.g., coordination) via one or more network interfaces.

The techniques described herein may enable the network entity 105 and the UE 115 to efficiently perform PUCCH resource adaption, which may lead to reduced power consumption at the network entity 105. For example, the network entity 105 may transmit first control signaling (e.g., such as RRC signaling) indicating a first set of PUCCH resource occasions and a second set of PUCCH resource occasions for use by the UE 115. The UE 115 may use the resource occasions of the first set of PUCCH resource occasions to transmit one or more uplink messages, where the first set of PUCCH resource occasions may otherwise be referred to as a default set of PUCCH resource occasions. The UE 115 may switch from using the resource occasions of the first set of PUCCH resource occasions to using resource occasions of the second set of PUCCH resource occasions dynamically based on second control signaling (e.g., DCI from the network entity 105 or UCI sent from the UE 115).

In such examples, the first set of PUCCH resource occasions may have less resource occasions relative to those of the second set of PUCCH resource occasions, thereby enabling the network entity 105 to conserve power due to monitoring the relatively fewer resource occasions of the first set of PUCCH resource occasions. Alternatively, the second set of PUCCH resource occasions may have less resource occasions relative to those of the first set of PUCCH resource occasions. As such, the network entity 105, or UE 115, may indicate to switch to using the second set of PUCCH resource occasions during times when traffic between the UE 115 and the network entity 105 is relatively low, thereby reducing power consumption at the network entity 105. In some other examples, the second set of PUCCH resource occasions may be an empty set. As such, by switching from operating in the first set of PUCCH resource occasions to operating in the second set of PUCCH resource occasions, the UE 115 may skip transmitting one or more uplink messages, thereby enabling the network entity 105 to refrain from monitoring for such uplink messages and conserve power.

Figure 2:
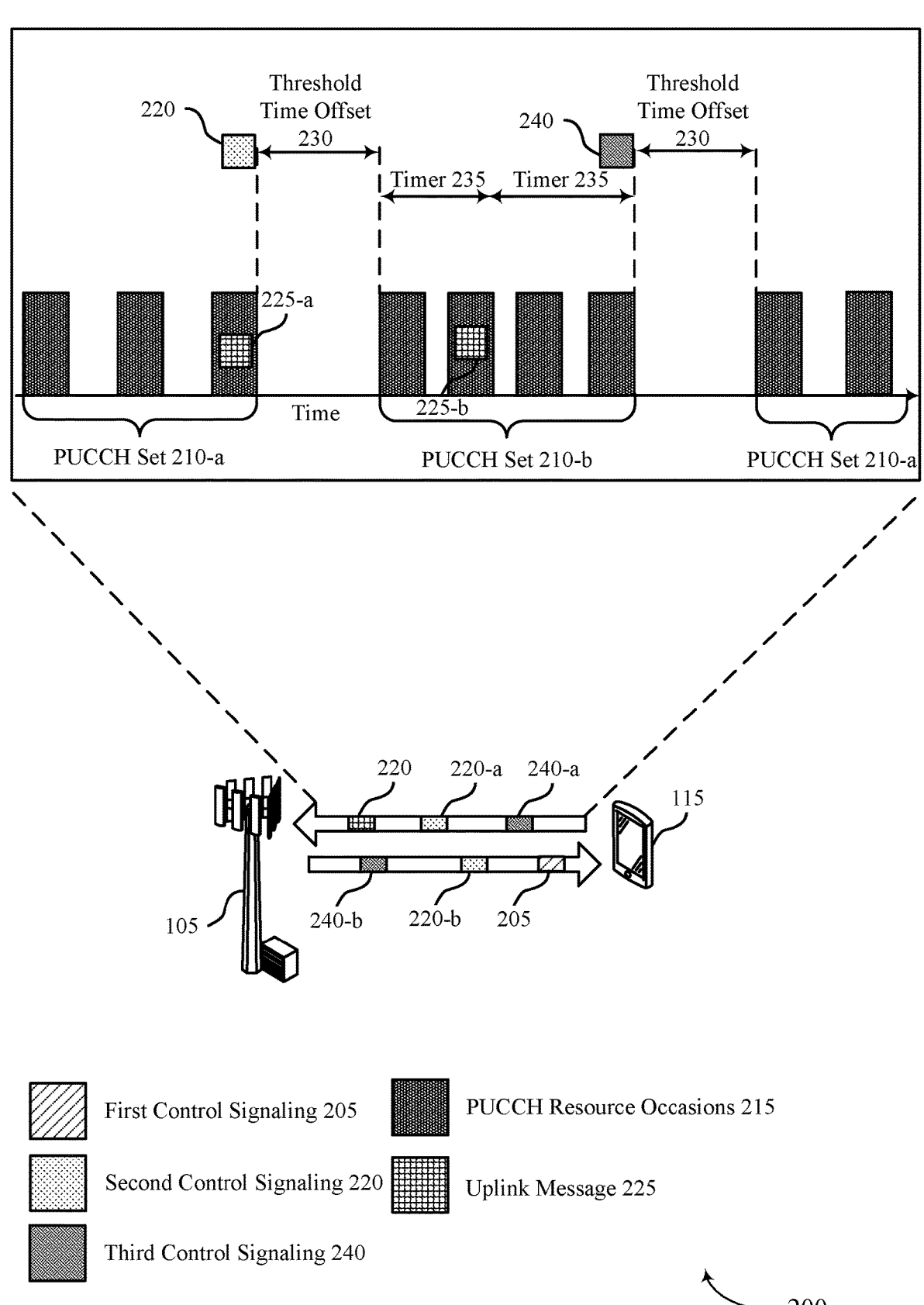
FIG. 2 shows an example of a wireless communications system that supports techniques for PUCCH adaptation in accordance with one or more aspects of the present disclosure.

FIG. 2 shows an example of a wireless communications system 200 that supports techniques for PUCCH adaptation in accordance with one or more aspects of the present disclosure. Aspects of the wireless communications system 200 may implement, or be implemented by, aspects of the wireless communications system 100. For example, the wireless communications system 200 may include a network entity 105 and a UE 115, which may be examples of corresponding devices described herein with reference to FIG. 1. The network entity 105 and the UE 115 may implement techniques for PUCCH adaption in order to enable the network entity 105 to reduce power consumption.

In some cases, the network entity 105 may communicate with a UE 115 via various channels. For example, the UE 115 may communicate uplink messages to the network entity 105 via a PUSCH, while the network entity 105 may communicate downlink messages to the UE 115 via a PDSCH. To facilitate uplink communications, the UE 115 may dynamically transmit a scheduling request via one or more PUCCH resource occasions 215 to initiate uplink data transmissions with the network entity 105. Similarly, to facilitate downlink communications, the network entity 105 may dynamically transmit a scheduling DCI via a PDCCH resource in order to initiate downlink data transmissions with the UE 115. In such examples, the network entity 105 and the UE 115 may periodically monitor the PUCCH resource occasions 215 and PDCCH resource occasions for such messages, which may increase power consumption at the network entity 105 and the UE 115.

To support reduced power consumption at the UE 115, the network entity 105 and the UE 115 may implement PDCCH monitoring adaptation in order to reduce the PDCCH monitoring efforts of the UE 115 (e.g., thereby saving power at the UE 115). In some cases, the network entity 105 and UE 115 may support PDCCH resource occasion skipping as a part of PDCCH monitoring adaptation. That is, the network entity 105 may indicate for the UE 115 to stop monitoring one or more PDCCH resource occasions (e.g., PDCCH resources intended for the UE 115) via a PDCCH monitoring adaptation field of a scheduling DCI. As such, the UE 115 may reduce power consumption and save energy by refraining from monitoring the PDCCH resource occasions.

Additionally, or alternatively, the network entity 105 and the UE 115 may support search space set group (SSSG) switching. In such cases, the network entity 105 may configure the UE 115 with two or more SSSGs, where each SSSG may include varying (e.g., different) levels of PDCCH monitoring efforts. That is, the network entity 105 may configure the two or more SSSGs with different densities (e.g., quantities) of PDCCH resource occasions, different quantities of PDCCH resource candidates, or the like. As such, the network entity 105 may indicate for the UE 115 to stop monitoring a first SSSG and switch to monitoring a second SSSG via a PDCCH monitoring adaptation field that is shared with a PDCCH skipping indication of a scheduling DCI. In an example, the network entity 105 may configure a first SSSG with a sparse set of PDCCH resource occasions (e.g., a light set) relative to those of a second SSSG. As such, when the UE 115 receives the indication to monitor the PDCCH resource occasions of the first SSSG, the UE 115 may experience reduced power consumption due to monitoring relatively fewer PDCCH resource occasions.

However, using current techniques, a network entity may not be able to have similar power savings as the UE 115. For example, current techniques may not enable the network entity 105 to reduce PUCCH resource occasion 215 monitoring and detection efforts, resulting in increased power consumption at the network entity 105.

In some implementations, the network entity 105 and the UE 115 may implement techniques to skip one or more PUCCH resource occasions 215, switch between PUCCH sets 210, or both, in order to reduce power consumption and save power at the network entity 105. Such operations may be triggered by the UE 115 (e.g., via a PUSCH occasion skipping indication of a UCI or a separate field of the UCI) or by the network entity 105 (e.g., via an indication in a scheduling DCI).

For example, the network entity 105 may configure (e.g., determine) at least a PUCCH set 210-a and a PUCCH set 210-b (e.g., multiple sets of PUCCH resource occasions) for use by the UE 115. In some examples, each PUCCH set 210 may include multiple PUCCH resource occasions 215. Such PUCCH sets 210 may be referred to as a PUCCH resource group (PRG). Additionally, or alternatively, each PUCCH set 210 may include multiple PUCCH sets 210, where each PUCCH set 210 of the multiple may include one or more PUCCH resource occasions 215. The PUCCH sets 210 that include multiple PUCCH sets 210 may be referred to as a PUCCH resource set group (PRSG). Further, in some examples, the network entity 105 may configure an empty PUCCH set 210 (e.g., a PUCCH set 210 that does not include PUCCH resource occasions 215). As such, if the UE 115 is to skip one or more PUCCH resource occasions 215, the UE 115 may switch to operating in the empty PUCCH set 210 as described herein with reference to FIG. 4.

Based on configuring each PUCCH set 210, the network entity 105 may transmit, to the UE 115, first control signaling 205 (e.g., such as RRC signaling) that indicates the PUCCH set 210-a (e.g., a first set of PUCCH resource occasions) and the PUCCH set 210-b (e.g., a second set of PUCCH resource occasions). In some examples, the network entity 105 may indicate that the PUCCH set 210-a is a default PUCCH group. As such, the UE 115 may assume, or begin to operate in, the PUCCH set 210-a based on receiving the first control signaling 205 (e.g., when switching between PUCCH sets 210 is configured). In such examples, the network entity 105 may configure the PUCCH set 210-a (e.g., default PUCCH group) with fewer PUCCH resource occasions 215 relative to those configured in the PUCCH set 210-b. Alternatively, the network entity 105 may configure the PUCCH set 210-a (e.g., default PUCCH group) with an increased quantity of PUCCH resource occasions 215 relative to those configured in the PUCCH set 210-*b*.

In some examples, the UE 115 may dynamically communicate second control signaling 220 indicating that the UE 115 is to switch from operating in the PUCCH set 210-*a* to operating in the PUCCH set 210-*b*. For example, the UE 115 may transmit second control signaling 220-*a* indicating to switch from the PUCCH set 210-*a* to the PUCCH set 210-*b*, where the second control signaling 220-*a* may be an example of UCI. In such examples, the UE 115 may transmit the indication to switch PUCCH sets 210 as part of the indication to skip one or more configured grant PUSCH occasions via the UCI. That is, the UE 115 may piggy-back the indication to switch PUCCH sets 210 with the PUSCH skipping indication of the UCI. For example, when the UE 115 transmits the indication of PUSCH skipping via the second control signaling 220-*a* (e.g., UCI), the UE 115 may also imply that the UE 115 is to switch between PUCCH sets 210. Alternatively, the UE 115 may indicate the switch between PUCCH sets 210 (e.g., PUCCH adaptation) via a field of the UCI that is subsequent to the configured grant PUSCH occasion skipping indication. That is, the indication to switch between PUCCH sets 210 may be separate from the indication of PUSCH skipping in the second control signaling 220 (e.g., UCI).

The UE 115 may transmit the second control signaling 220-*a* (e.g., the UCI) indicating the switch between PUCCH sets 210 (e.g., PUCCH adaptation) based on the UE traffic, a size of a buffer at the UE 115, or both. In an example, the PUCCH set 210-*a* may include less PUCCH resource occasions 215 relative to those of the PUCCH set 210-*b*, thereby enabling the network entity 105 to reduce power consumption due to the reduction in monitoring efforts while operating in the PUCCH set 210-*a*. As such, when the UE 115 has urgent or frequent uplink data to transmit, or the size of the buffer of the UE 115 satisfies a threshold, the UE 115 may transmit the second control signaling 220-*a* (e.g., UCI) indicating to switch to operating in the PUCCH set 210-*b*, which contains denser PUCCH resource occasions 215.

As another illustrative example, the PUCCH set 210-*a* may include more PUCCH resource occasions 215 relative to those of the PUCCH set 210-*b*. As such, if the UE 115 has relatively less traffic or relatively less data in the buffer of the UE 115, then the UE 115 may dynamically indicate, to the network entity 105 via the second control signaling 220-*a* (e.g., UCI), to switch to the PUCCH set 210-*b*, which may have sparser PUCCH resource occasions 215, thereby enabling the network entity 105 to reduce power consumption. In this way, the UE 115 may dynamically indicate to switch between PUCCH sets 210 according to traffic at the UE 115, the buffer size of the UE 115, or both.

In some other examples, the network entity 105 may dynamically communicate the second control signaling 220 indicating that the UE 115 is to switch from operating in the PUCCH set 210-*a* to operating in the PUCCH set 210-*b*. For example, the network entity 105 may transmit second control signaling 220-*a* that includes the indication to switch PUCCH sets 210, where the second control signaling 220-*a* may be DCI. That is, the network entity 105 may include the indication to switch between the PUCCH sets 210 (e.g., PUCCH adaptation indication) via a field of the second control signaling 220-*b* (e.g., DCI).

In some examples, the network entity 105 may associate the PUCCH adaptation with the indication of PDCCH adaptation. For example, the network entity 105 may transmit the second control signaling 220-*b* (e.g., DCI) that indicates for the UE 115 to perform PDCCH resource skipping (e.g., skip one or more PDCCH resource occasions). As such, based on receiving the indication to skip one or more PDCCH resource occasions, the UE 115 may skip one or more PUCCH resource occasions 215 by switching to an empty PUCCH set 210 (e.g., as described with reference to FIG. 4). That is, if the network entity 105 transmits, via the second control signaling 220-*b* (e.g., DCI) that the UE 115 is perform PDCCH skipping, then the UE 115 may also skip one or more PUCCH resource occasions 215. Similarly, the network entity 105 may associate switching between the PUCCH sets 210 with performing SSSG switching. For example, the network entity 105 may indicate, via the second control signaling 220-*b*, for the UE 115 to switch between a first SSSG and a second SSSG. As such, based on the second control signaling 220-*b* (e.g., DCI) indicating for the UE 115 to switch between SSSGs, the UE 115 may also switch between the PUCCH set 210-*a* and the PUCCH set 210-*b*.

In some examples, the network entity 105 may transmit the second control signaling 220-*b* indicating for the UE 115 to switch between the PUCCH sets 210 based on traffic at the network entity, in accordance with cell DTX and DRX cycles, or both. In this way, the network entity 105 may dynamically transmit indications for the UE 115 to operate in sparser or denser PUCCH sets 210 in order to maintain communication in the wireless communications system 200 and reduce power consumption at the network entity 105.

In some examples, the second control signaling 220 (e.g., DCI or UCI) may include various codepoint values to indicate whether the UE 115 is to skip one or more PUCCH resource occasions 215, switch between PUCCH sets 210, or both. As illustrated in table 1 below, a first codepoint value, of the second control signaling 220, may indicate that the UE 115 is to not skip PUCCH resource occasions 215 nor switch between PUCCH sets 210. A second codepoint value may indicate for the UE 115 to skip one or more PUCCH resource occasions 215 (e.g., switch to an empty PUCCH set 210) for a duration of a timer, which may be further described herein with reference to FIG. 4. A third codepoint value may indicate for the UE 115 to switch to operating in the PUCCH set 210-*a* (e.g., the default PUCCH group), while a fourth codepoint value may indicate for the UE 115 to switch to operating in the PUCCH set 210-*b* (e.g., non-default PUCCH group). It should be understood that the aforementioned codepoints may not be all inclusive, and that the second control signaling 220 may include a variety of additional codepoint values to indicate various operations.

TABLE 1

| Codepoint Values and Operations | |
| --- | --- |
| Codepoint Value | Operation |
| 0 | Refrain from skipping PUCCH resource occasions 215 or Switching between PUCCH sets 210 |
| 1 | Skip PUCCH resource occasions 215 for a duration of time T |
| 2 | Switch to PUCCH set 210-a (e.g., Default Group) |
| 3 | Switch to PUCCH set 210-b (e.g., Non-Default Group) |

In some other examples, the UE 115 may switch from operating in the PUCCH set 210-*a* to operating in the PUCCH set 210-*b* in response to transmitting an uplink message 225. For example, when the UE 115 is operating within the PUCCH set 210-*a* (e.g., default PUCCH group), the UE 115 may switch to the PUCCH set 210-*b* (e.g., non-default PUCCH group) after transmitting the uplink message 225-*a* via a PUCCH resource occasion 215. The network entity 105 may receive the uplink message 225-*a* and proceed to switch from operating in the PUCCH set 210-*a* to operating in the PUCCH set 210-*b*. In this way, the UE 115 and the network entity 105 may dynamically switch between the PUCCH set 210-*a* (e.g., default PUCCH group) and the PUCCH set 210-*b* (e.g., non-default PUCCH group) without incurring additional signaling overhead.

The network entity 105 and the UE 115 may perform the switch from the PUCCH set 210-*a* to the PUCCH set 210-*b* according to a threshold time offset 230 (e.g., an application delay) from the second control signaling 220 or the transmission time of the uplink message 225-*a*. The threshold time offset 230 may be a minimum time offset between a transmission or reception time of the second control signaling 220 and when the network entity 105 stops monitoring the PUCCH resource occasions 215 of the PUCCH set 210-*a* (e.g., old PUCCH group) and begins monitoring the PUCCH resource occasions 215 of the PUCCH set 210-*b* (e.g., new PUCCH group). Likewise, the threshold time offset 230 may be the minimum time offset between when the UE 115 stops transmitting the uplink messages 225 via the PUCCH resource occasions 215 of the PUCCH set 210-*a* and begins transmitting uplink messages 225 via the PUCCH resource occasions in the PUCCH set 210-*b*. The threshold time offset 230 may be configured by the network entity 105 via first control signaling 205, dynamically indicated via second control signaling 220, or predefined in a standard.

Based on switching to the PUCCH set 210-*b*, the UE 115 and the network entity 105 may operate in the PUCCH set 210-*b* (e.g., non-default PUCCH group) for a duration of a timer 235. The duration (T) of the timer 235 may be predefined in a standard, signaled via the first control signaling 205, or dynamically indicated via the second control signaling 220. The UE 115 and the network entity 105 may set the duration of the timer 235 (e.g., start the timer 235) after the duration of the threshold time offset 230 (e.g., when the devices begin to operate in the PUCCH set 210-*b*). That is, the UE 115 and the network entity 105 may start the timer 235 in response to beginning to use (e.g., transmit or monitor) the PUCCH resource occasions 215 of the PUCCH set 210.

In some examples, when the UE 115 and the network entity 105 are operating using the PUCCH set 210-*b* (e.g., non-default PUCCH group), the UE 115 and the network entity 105 may reset the duration of the timer in response to the transmission of an uplink message 225-*b*. In an example, the UE 115 may transmit the uplink message 225-*b* via a PUCCH resource occasion 215 of the PUCCH set 210-*b*. In response to transmitting the uplink message 225-*b*, the UE 115 and the network entity 105 may reset the timer 235 and continue to operate using the PUCCH resource occasions 215 of the PUCCH set 210-*b* until expiration of the timer 235. After expiration of the timer 235, the UE 115 and the network entity 105 may switch from operating using the PUCCH set 210-*b* to operating using the PUCCH set 210-*a* (e.g., default PUCCH group).

In some examples, the UE 115 and the network entity 105 may switch from operating in the PUCCH set 210-*b* to operating in the PUCCH set 210-*a* in response to third control signaling 240. For example, while operating using the PUCCH set 210-*b* (e.g., non-default PUCCH group), the UE 115 or the network entity 105 may transmit third control signaling 240 indicating for the UE 115 to switch from operating using the PUCCH set 210-*b* to operating using the PUCCH set 210-*a*. In such examples, the UE 115 may transmit third control signaling 240-*a*, which may be an example of UCI. Alternatively, the network entity 105 may transmit third control signaling 240-*b*, which may be an example of DCI. The third control signaling 240 may include the same indications and format as described herein with reference to the second control signaling 220. That is, the third control signaling 240 may include the codepoint values indicated in table 1, or include the implicit indications as described herein.

Based on expiration of the timer 235 or the third control signaling 240, the UE 115 and network entity 105 may perform the switch from the PUCCH set 210-*b* to the PUCCH set 210-*a* according to the threshold time offset 230 (e.g., an application delay) from the third control signaling 240 or expiration of the timer 235. That is, the UE 115 may transmit one or more uplink messages 225 via the PUCCH resource occasions 215 of the PUCCH set 210-*b* and the network entity 105 may monitor the PUCCH resource occasions 215 of the PUCCH set 210-*b* while the timer 235 is active. Based on expiration of the timer 235, the UE 115 and the network entity 105 may switch to operating in the PUCCH set 210-*a* (e.g., default PUCCH group). Additionally, or alternatively, while operating using the PUCCH resource occasions 215 of the PUCCH set 210-*b*, the UE 115, or network entity 105, may transmit third control signaling 240 indicating to switch from the PUCCH set 210-*b* to the PUCCH set 210-*a*.

By enabling the network entity 105 to perform PUCCH adaptation (e.g., skip one or more PUCCH resource occasions 215 or switch between PUCCH sets 210), the network entity 105 may reduce power consumption associated with monitoring PUCCH resource occasions 215. In this way, the network entity 105 may implement further power saving techniques for NES.

Figure 3:
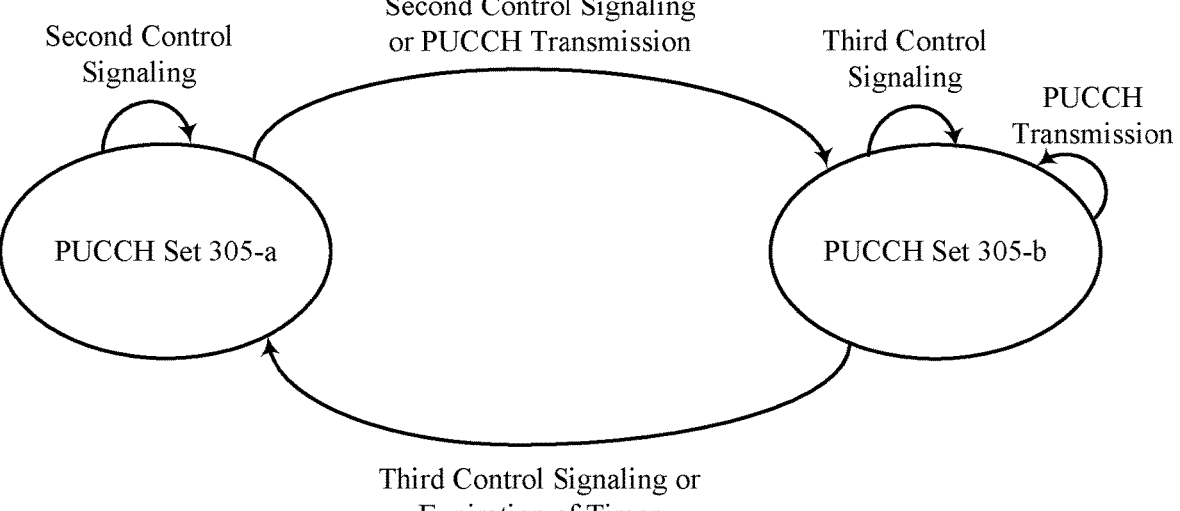
FIG. 3 shows an example of a state diagram that supports techniques for PUCCH adaptation in accordance with one or more aspects of the present disclosure.

FIG. 3 shows an example of a state diagram 300 that supports techniques for PUCCH adaptation in accordance with one or more aspects of the present disclosure. Aspects of the state diagram 300 may be implemented by aspects of the wireless communications system 100 and the wireless communication system 200 as described herein with reference to FIGS. 1 and 2. For example, the state diagram 300 may be implemented by a network entity 105 and a UE 115, which may be examples of corresponding devices described herein. The network entity 105 and the UE 115 may implement aspects of the state diagram 300 in order to perform PUCCH set switching as described herein with reference to FIG. 2.

For example, the network entity 105 may configure a PUCCH set 305-*a* and a PUCCH set 305-*b*, which may be examples of the PUCCH sets 210 described herein with reference to FIG. 2. The PUCCH set 305-*a* may be referred to as a default PUCCH group, while the PUCCH set 305-*b* may be referred to as a non-default PUCCH group. Each PUCCH set 305 may have different levels of PUCCH monitoring efforts for the network entity 105. For example, the PUCCH set 305-*a* may include less PUCCH resource occasions relative to those of the PUCCH set 305-*b*, or vice versa. In some examples, the PUCCH set 305-*b* may be an empty set, to be used by the UE 115 to skip one or more PUCCH resource occasions as further described herein with reference to FIG. 4.

The network entity 105 may transmit first control signaling (e.g., RRC signaling) indicating the PUCCH sets 305 to the UE 115, where the UE 115 and network entity 105 may assume, or begin to operate using, the PUCCH resource occasions of the PUCCH set 305-*a*. The first control signaling may be an example of the first control signaling 205 described herein with reference to FIG. 2. Alternatively, the UE 115 and the network entity 105 may assume, or begin to operate using, the PUCCH resource occasions of the PUCCH set 305-a in response to second control signaling (e.g., UCI from the UE 115 or DCI from the network entity 105) which may be an example of second control signaling 220 as described herein with reference to FIG. 2. The UE 115 and the network entity 105 may operate using the PUCCH resource occasions of the PUCCH set 305-a while periodically indicating the use of the PUCCH set 305-a via the second control signaling.

In some examples, the UE 115 and the network entity 105 may switch from using the PUCCH set 305-a to using the PUCCH set 305-b based on second control signaling as described herein with reference to FIG. 2. Additionally, or alternatively, the UE 115 and the network entity 105 may switch from using the PUCCH set 305-a to using the PUCCH set 305-b in response to a PUCCH transmission (e.g., uplink message 225) sent using the PUCCH set 305-a.

The UE 115 and the network entity 105 may being operating using the PUCCH set 305-b in accordance with a threshold time offset, which may be defined from the reception or transmission time of the second control signaling or PUCCH transmission to the beginning of use of the PUCCH set 305-b. In some examples, the UE 115 and the network entity 105 may operate using the PUCCH set 305-b for a duration of a timer, such as a timer 235 as described herein with reference to FIG. 2. The UE 115 and the network entity 105 may start the timer after the threshold time offset (e.g., when the devices begin operating using the PUCCH set 305-b).

In some examples, the UE 115 and the network entity 105 may reset the timer, thereby continuing to operate using the PUCCH set 305-b, based on PUCCH transmissions. That is, in response to a PUCCH transmission, the UE 115 and the network entity 105 may reset the duration of the timer. Additionally, or alternatively, the UE 115 and the network entity 105 may continue to operate using the resource occasions of the PUCCH set 305-b based on third control signaling, such as third control signaling as described herein with reference to FIG. 2. For example, the UE 115 may transmit third control signaling (e.g., UCI) or the network entity 105 may transmit third control signaling (e.g., DCI) indicating to continue to use, or otherwise operate, using the resource occasions of the PUCCH set 305-b. The UE 115 and the network entity 105 may switch from using the PUCCH set 305-b to using the PUCCH set 305-a in response to the expiration of the timer as described herein with reference to FIG. 2. In some examples, the UE 115 and the network entity 105 may switch from using the PUCCH set 305-b to using the PUCCH set 305-a based on the third control signaling, such as third control signaling 240 as described herein with reference to FIG. 2.

By enabling the network entity 105 and the UE 115 to perform PUCCH adaption (e.g., switch between PUCCH sets 305 or skip PUCCH resource occasions), the network entity 105 may reduce power consumption. Further, by switching between PUCCH sets 305 with varying levels of PUCCH resource occasions, the network entity 105 and the UE 115 may switch between sparser and denser PUCCH sets 305 based on the traffic of the UE, buffer size of the UE, or network capacity, thereby leading to increased, or improved, coordination between devices.

Figure 4:
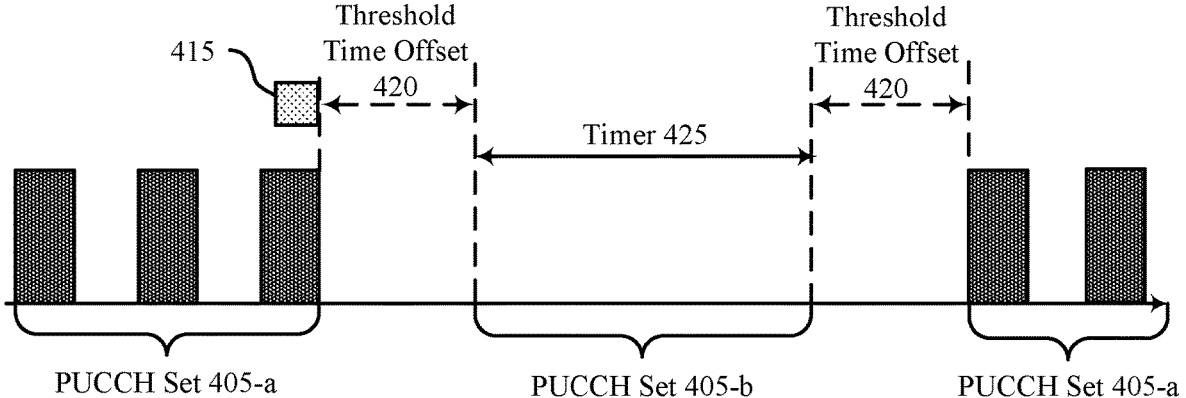
FIG. 4 shows an example of a timing diagram that supports techniques for PUCCH adaptation in accordance with one or more aspects of the present disclosure.
Figure 4:
Figure 4:

FIG. 4 shows an example of a timing diagram 400 that supports techniques for PUCCH adaptation in accordance with one or more aspects of the present disclosure. Aspects of the timing diagram 400 may implement, or be implemented by, aspects of the wireless communications system 100, the wireless communications system 200, and the state diagram 300 as described herein with reference to FIGS. 1 through 3. For example, the timing diagram 400 may be implemented by a UE 115 and a network entity 105, which may be examples of network entities 105 and UEs 115 described herein. Further, the network entity 105 and the UE 115 may implement the techniques of the timing diagram 400 in order to skip one or more PUCCH resource occasions 410.

In some implementations, the network entity 105 may configure multiple PUCCH sets 405 (e.g., such as a PUCCH set 405-a and a PUCCH set 405-b) with varying levels, or quantities, of PUCCH resource occasions 410. Such PUCCH sets 405 may be examples of the PUCCH sets 210 and the PUCCH sets 305 described herein with reference to FIGS. 2 and 3. For example, the PUCCH set 405-a may include one or more PUCCH resource occasions 410, while the PUCCH set 405-b may not include PUCCH resource occasions 410. As such, the PUCCH set 405-b may be referred to as an empty set.

The network entity 105 may transmit first control signaling (e.g., RRC signaling) indicating the PUCCH set 405-a and the PUCCH set 405-b to the UE 115. The first control signaling may be an example of the first control signaling 205 as described herein with reference to FIG. 2. In some examples, the network entity 105 may determine one or more PUCCH transmissions to skip based on a PUCCH format of the PUCCH transmissions, on the PUCCH resource occasions 410, or on the PUCCH sets 405 that the UE 115 and the network entity 105 are using. That is, in the first control signaling, the network entity 105 may indicate to the UE 115 one or more PUCCH formats (e.g., PUCCH formats 0 through 4) that the UE 115 may skip. In an example, the network entity 105 may indicate that the UE 115 may skip PUCCH transmissions with PUCCH formats 0 and 1, but not skip PUCCH transmissions with PUCCH formats 2, 3, or 4. Further, the network entity 105 may indicate that the UE 115 is to refrain from skipping one or more PUCCH resource occasions 410 associated with a PUCCH set 405 (e.g., such as a default PUCCH set or specific PUCCH set).

In response to receiving the first control signaling, the UE 115 and network entity 105 may assume, or otherwise begin using, the PUCCH resource occasions 410 of the PUCCH set 405-a. In some examples, the UE 115, or network entity 105, may dynamically communicate second control signaling 415 (e.g., UCI from the UE 115 or DCI from the network entity 105) indicating for the UE 115 to skip one or more PUCCH resource occasions 410 (e.g., skip one or more PUCCH transmissions) for a duration of a timer 425. The second control signaling 415 may be an example of the second control signaling 220, as described herein with reference to FIG. 2. In such examples, the timer 425 may be a predetermined value indicated in a standard (e.g., such as the 3GPP standards). Additionally, or alternatively, UE 115 or network entity 105, may select a duration of the timer from a predefined set of durations for the timer 425 (e.g., predefined in the standards) and indicate the selected duration for the timer 425 via the second control signaling 415.

In response to the second control signaling 415 (e.g., dynamic signaling), the network entity 105 may immediately stop detecting the associated PUCCH resource occasions of the PUCCH set 405-a starting from the first PUCCH resource occasion 410 after the second control signaling 415. Likewise, the UE 115 may immediately stop transmitting PUCCH transmissions via the PUCCH resource occasions 410 of the PUCCH set 405-*a* starting from the first PUCCH resource occasion 410 after the second control signaling 415. That is, in response to the second control signaling 415, the UE 115 and the network entity 105 may immediately switch from using the PUCCH resource occasions of the PUCCH set 405-*a* to operating in the PUCCH set 405-*b* (e.g., the empty set).

Alternatively, the network entity 105 and the UE 115 may switch from the PUCCH set 405-*a* to the PUCCH set 405-*b* (e.g., empty set) in accordance with a threshold time offset 420 (e.g., an application delay) between the second control signaling 415 and the first PUCCH resource occasion 410 where the network entity 105 stops detecting and the UE 115 stops transmitting the associated PUCCH transmissions. That is, the network entity 105 may continue to monitor the PUCCH resource occasions 410 of the PUCCH set 405-*a* during the threshold time offset 420 and stop monitoring PUCCH resource occasions 410 (e.g., switch to the PUCCH set 405-*b*) after the threshold time offset 420. The threshold time offset 420 may be an example of the threshold time offset 230 as described herein with reference to FIG. 2.

The UE 115 and the network entity 105 may skip PUCCH transmissions (e.g., operate in the PUCCH set 405-*a*) for the duration of the timer 425. Based on expiration of the duration of the timer 425, the UE 115 and the network entity 105 may switch to operating in the PUCCH set 405-*a* immediately, or after a threshold time offset 420. In this way, when the UE 115 stops transmitting the PUCCH transmissions via the PUCCH resource occasions of the PUCCH set 405-*a*, the network entity 105 may have opportunities to enter into a sleep mode, thereby reducing power consumption and saving energy at the network entity 105.

Figure 5:
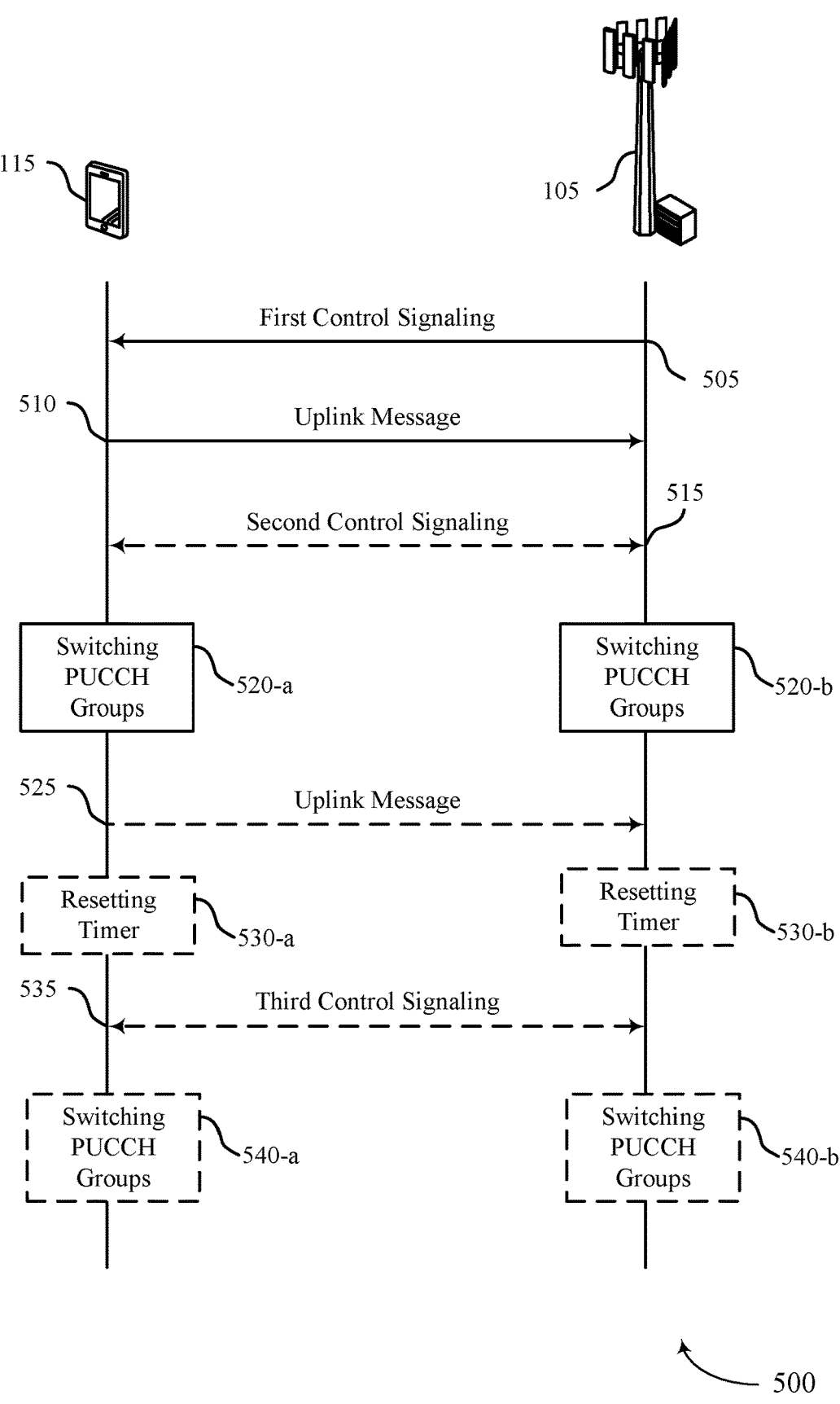
FIG. 5 shows an example of a process flow that supports techniques for PUCCH adaptation in accordance with one or more aspects of the present disclosure.

FIG. 5 shows an example of a process flow 500 that supports techniques for PUCCH adaptation in accordance with one or more aspects of the present disclosure. Aspects of the process flow 500 may implement, or be implemented by, aspects of the wireless communications system 100, the wireless communications system 200, the state diagram 300, and the timing diagram 400 as described herein. For example, aspects of the process flow 500 may be implemented by a UE 115 and a network entity 105, which may be examples of corresponding devices described herein with reference to FIGS. 1 through 4. The UE 115 and the network entity 105 may implement the techniques of the process flow 500 to enable switching between PUCCH sets, resulting in power savings at the network entity 105.

In the following description of the process flow 500, the operations may be performed in a different order than the order shown. Specific operations also may be left out of the process flow 500, or other operations may be added to the process flow 500. Further, although some operations or signaling may be shown to occur at different times for discussion purposes, these operations may actually occur at the same time.

At 505, the network entity 105 may transmit first control signaling (e.g., such as first control signaling 205) indicating at least a first set of PUCCH resource occasions (e.g., such as a PUCCH set 210-*a*, PUCCH set 305-*a*, or PUCCH set 405-*a*) and a second set of PUCCH resource occasions (e.g., such as a PUCCH set 210-*b*, a PUCCH set 305-*b*, and a PUCCH set 405-*b*). At 510, the UE 115 may transmit uplink messages via a first PUCCH resource occasion (e.g., such as PUCCH resource occasions 215 or PUCCH resource occasions 410). That is, in response to the first control signaling, the UE 115 and the network entity 105 may assume, or otherwise begin to operate, using the first set of PUCCH resource occasions.

At 515, the UE 115, the network entity 105, or both may dynamically indicate second control signaling indicating to switch from using the resource occasions of the first set of PUCCH resource occasions to using the second set of PUCCH resource occasions. In some examples, the UE 115 may transmit UCI indicating the switching, where the UCI is the second control signaling as described herein with reference to FIG. 2. Alternatively, the network entity 105 may transmit DCI indicating the switching, where the DCI is the second control signaling as described herein with reference to FIG. 2.

At 520-*a* and 520-*b*, the UE 115 and the network entity 105 may switch from using the resource occasions of the first set of PUCCH resource occasions to using the resource occasions of the second set of PUCCH resource occasions. In some examples, the switch may be based on the second control signaling. In some other examples, the switch may be in response to the transmission of the uplink message at 510.

In some examples, the second set of PUCCH resource occasions may be an empty set, as described herein with reference to FIG. 4. In such examples, the UE 115 and the network entity 105 may skip one or more uplink messages for a duration of a timer. In such examples, the UE 115 and the network entity 105 may skip such uplink messages based on a PUCCH format of the one or more uplink messages. Further, the UE 115 and the network entity may begin skipping the one or more uplink messages (e.g., operating using the second set of PUCCH resource occasions) in accordance with a threshold time offset from a transmission and reception time of the second control signaling or the first uplink message as described herein with reference to FIGS. 2 and 4.

Alternatively, the second set of PUCCH resource occasions may include one or more PUCCH resource occasions. As such, the UE 115 and the network entity 105 may operate using the resource occasions of the second set of PUCCH resource occasions for a duration of a timer and in accordance with a threshold time offset from a transmission and reception time of the second control signaling or the first uplink message. For example, at 525, the UE 115 may transmit a second uplink message using a resource occasion of the second set of PUCCH resource occasions.

At 530-*a* and 530-*b*, in response to transmitting the second uplink message, the UE 115 and the network entity 105 may reset a duration of the timer. The network entity 105 and the UE 115 may continually reset the duration of the timer in response to the transmissions of uplink messages via the second set of PUCCH resources.

In some examples, at 535, the UE 115 or network entity 105 may optionally transmit third control signaling indicating to switch from the first set of PUCCH resource occasions to the second set of PUCCH resource occasions. Such third control signaling may be an example of third control signaling described herein with reference to FIGS. 1 through 3. At 540-*a* and 540-*b*, the network entity 105 and the UE 115 may switch from the second set of PUCCH resource occasions to the first set of PUCCH resource occasions in response to expiration of the timer, third control signaling, or a combination thereof.

Figure 6:
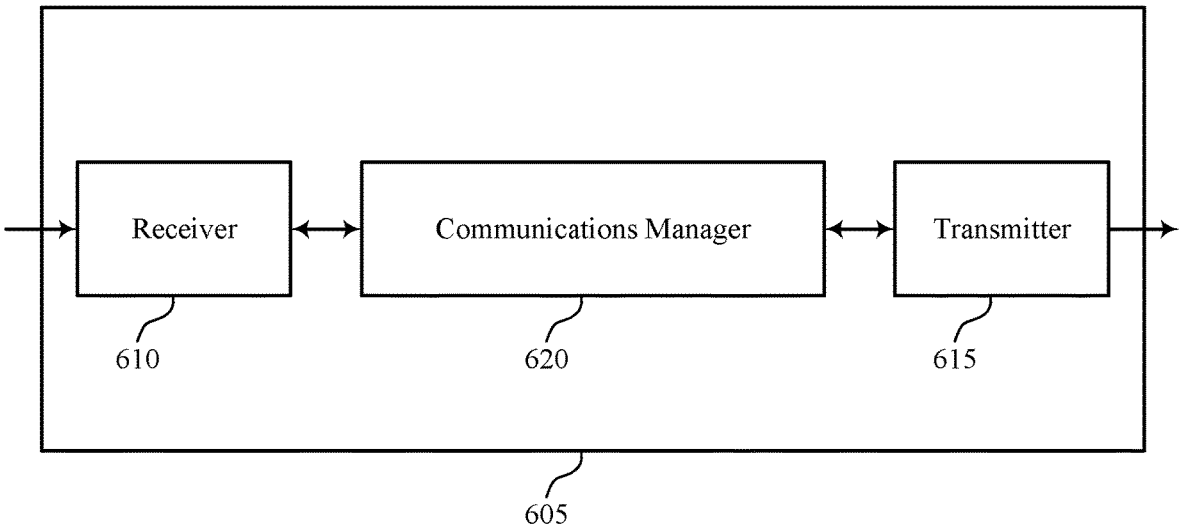
FIGS. 6 and 7 show block diagrams of devices that support techniques for PUCCH adaptation in accordance with one or more aspects of the present disclosure.

FIG. 6 shows a block diagram 600 of a device 605 that supports techniques for PUCCH adaptation in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for PUCCH adaptation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for PUCCH adaptation). In some examples, the transmitter 615 may be co-located with a receiver 610 in a transceiver component. The transmitter 615 may utilize a single antenna or a set of multiple antennas.

The communications manager 620, the receiver 610, the transmitter 615, or various combinations thereof or various components thereof may be examples of means for performing various aspects of techniques for PUCCH adaptation as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 is capable of, configured to, or operable to support a means for receiving first control signaling indicating at least a first set of PUCCH resource occasions and a second set of PUCCH resource occasions. The communications manager 620 is capable of, configured to, or operable to support a means for transmitting an uplink message via a first PUCCH resource occasion of the first set of PUCCH resource occasions. The communications manager 620 is capable of, configured to, or operable to support a means for switching from using resource occasions of the first set of PUCCH resource occasions to using resource occasions of the second set of PUCCH resource occasions, the switching being based on second control signaling indicating to switch from using the resource occasions of the first set of PUCCH resource occasions to using the resource occasions of the second set of PUCCH resource occasions.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for PUCCH adaptation, which may result in reduced power consumption and a more efficient utilization of communication resources.

Figure 7:
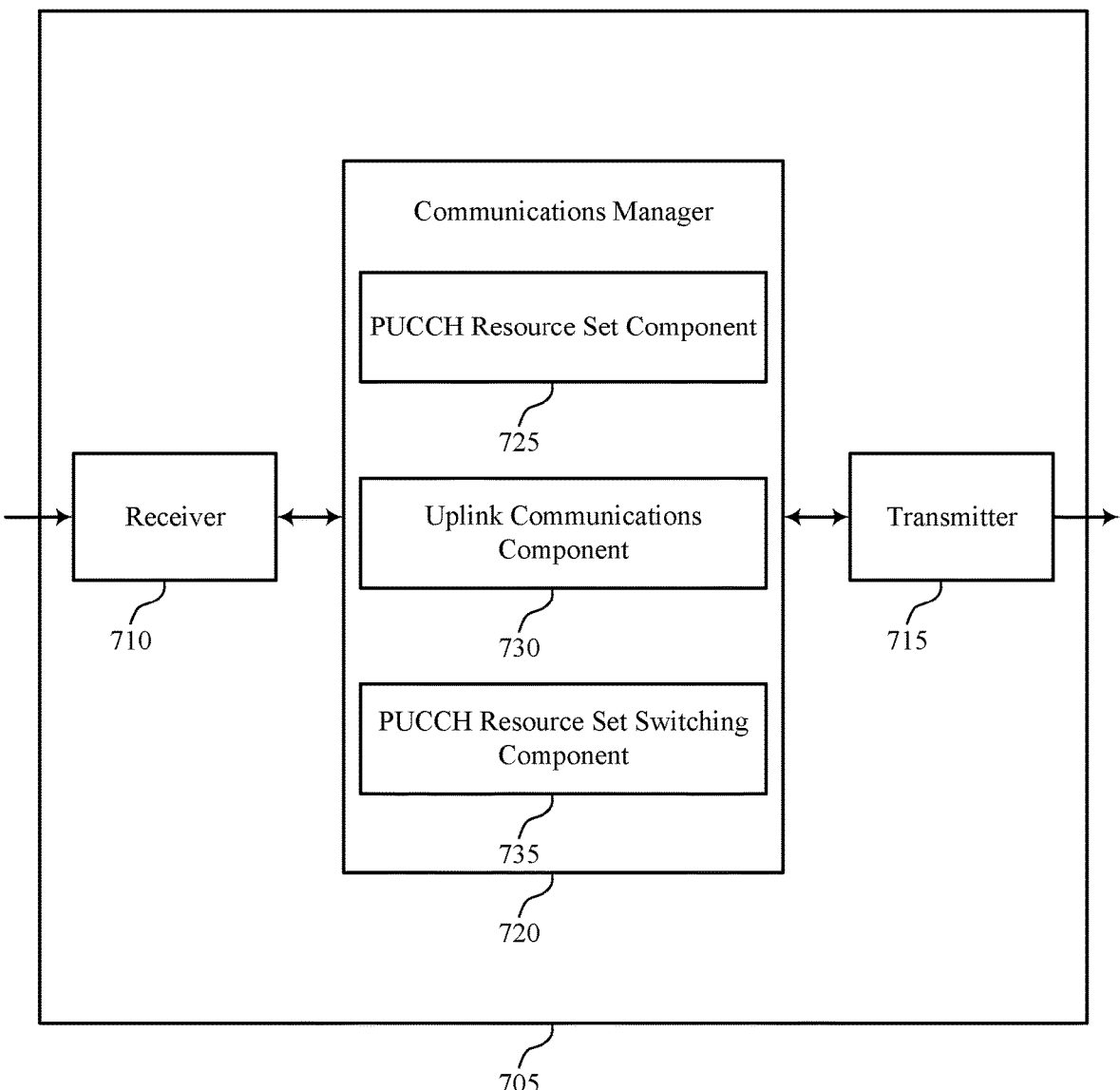

FIG. 7 shows a block diagram 700 of a device 705 that supports techniques for PUCCH adaptation in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for PUCCH adaptation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for PUCCH adaptation). In some examples, the transmitter 715 may be co-located with a receiver 710 in a transceiver component. The transmitter 715 may utilize a single antenna or a set of multiple antennas.

The device 705, or various components thereof, may be an example of means for performing various aspects of techniques for PUCCH adaptation as described herein. For example, the communications manager 720 may include a PUCCH Resource Set component 725, an uplink communications component 730, a PUCCH resource set switching component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The PUCCH Resource Set component 725 is capable of, configured to, or operable to support a means for receiving first control signaling indicating at least a first set of PUCCH resource occasions and a second set of PUCCH resource occasions. The uplink communications component 730 is capable of, configured to, or operable to support a means for transmitting an uplink message via a first PUCCH resource occasion of the first set of PUCCH resource occasions. The PUCCH resource set switching component 735 is capable of, configured to, or operable to support a means for switching from using resource occasions of the first set of PUCCH resource occasions to using resource occasions of the second set of PUCCH resource occasions, the switching being based on second control signaling indicating to switch from using the resource occasions of the first set of PUCCH resource occasions to using the resource occasions of the second set of PUCCH resource occasions.

Figure 8:
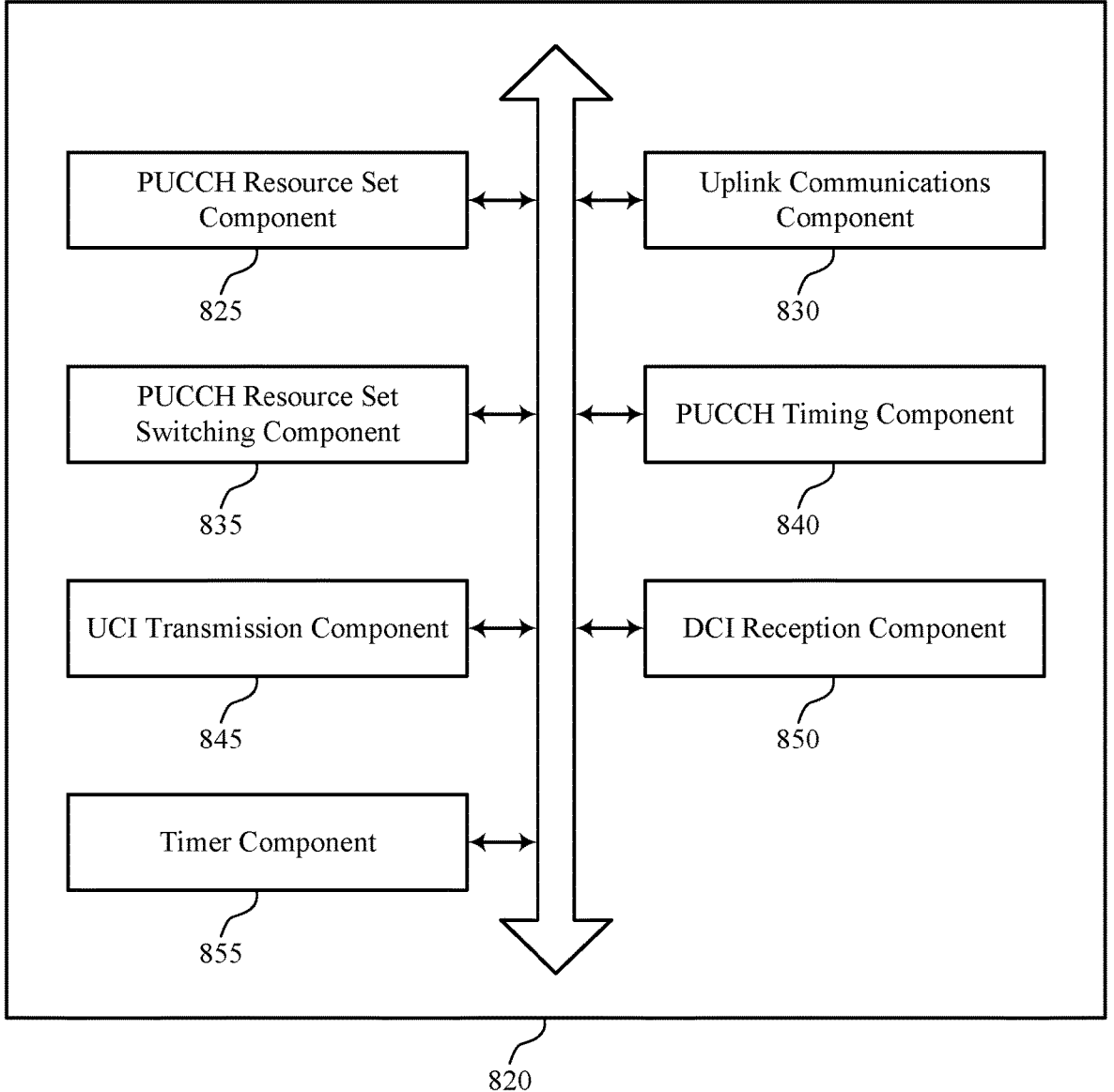
FIG. 8 shows a block diagram of a communications manager that supports techniques for PUCCH adaptation in accordance with one or more aspects of the present disclosure.

FIG. 8 shows a block diagram 800 of a communications manager 820 that supports techniques for PUCCH adaptation in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for PUCCH adaptation as described herein. For example, the communications manager 820 may include a PUCCH Resource Set component 825, an uplink communications component 830, a PUCCH resource set switching component 835, a PUCCH timing component 840, a UCI transmission component 845, a DCI reception component 850, a timer component 855, or any combination thereof. Each of these components may communicate, directly or indirectly, with one another (e.g., via one or more buses).

The communications manager 820 may support wireless communications at a UE in accordance with examples as disclosed herein. The PUCCH Resource Set component 825 is capable of, configured to, or operable to support a means for receiving first control signaling indicating at least a first set of PUCCH resource occasions and a second set of PUCCH resource occasions. The uplink communications component 830 is capable of, configured to, or operable to support a means for transmitting an uplink message via a first PUCCH resource occasion of the first set of PUCCH resource occasions. The PUCCH resource set switching component 835 is capable of, configured to, or operable to support a means for switching from using resource occasions of the first set of PUCCH resource occasions to using resource occasions of the second set of PUCCH resource occasions, the switching being based on second control signaling indicating to switch from using the resource occasions of the first set of PUCCH resource occasions to using the resource occasions of the second set of PUCCH resource occasions.

In some examples, the PUCCH timing component 840 is capable of, configured to, or operable to support a means for transmitting a second uplink message via a PUCCH resource occasion of the second set of PUCCH resource occasions in accordance with a threshold time offset between the second control signaling and transmitting the second uplink message.

In some examples, the timer component 855 is capable of, configured to, or operable to support a means for resetting a duration of a timer based on transmission of the second uplink message via the PUCCH resource occasion of the second set of PUCCH resource occasions, where using the resource occasions of the second set of PUCCH resource occasions is for the duration of the timer.

In some examples, the PUCCH resource set switching component 835 is capable of, configured to, or operable to support a means for switching from using the resource occasions of the second set of PUCCH resource occasions to using the resource occasions of the first set of PUCCH resource occasions based on expiration of a timer, third control signaling, or a combination thereof.

In some examples, switching from using the resource occasions of the first set of PUCCH resource occasions to using the resource occasions of the second set of PUCCH resource occasions is in response to transmitting the uplink message via the first PUCCH resource occasion of the first set of PUCCH resource occasions.

In some examples, the UCI transmission component 845 is capable of, configured to, or operable to support a means for transmitting UCI indicating to switch from using the resource occasions of the first set of PUCCH resource occasions to using the resource occasions of the second set of PUCCH resource occasions, where the second control signaling includes the UCI.

In some examples, the DCI reception component 850 is capable of, configured to, or operable to support a means for receiving DCI indicating to switch from using the resource occasions of the first set of PUCCH resource occasions to using the resource occasions of the second set of PUCCH resource occasions, where the second control signaling includes the DCI.

In some examples, the DCI reception component 850 is capable of, configured to, or operable to support a means for receiving DCI indicating to switch from using resource occasions of a first set of PDCCH resource occasions to using resource occasions of a second set of PDCCH resource occasions, where the switching is based on receiving the DCI, the second control signaling including the DCI.

In some examples, the second set of PUCCH resource occasions includes an empty set, and the switching is further based on the second control signaling indicating for the UE to skip one or more uplink messages.

In some examples, switching to the second set of PUCCH resource occasions including the empty set is further based on a PUCCH format of the one or more uplink messages.

In some examples, the second control signaling indicates a duration of a timer associated with operating in the second set of PUCCH resource occasions including the empty set, and operating in the second set of PUCCH resource occasions including the empty set is for the duration of the timer.

In some examples, switching to operating in the second set of PUCCH resource occasions including the empty set is in accordance with a threshold time offset from the second control signaling.

In some examples, the UCI transmission component 845 is capable of, configured to, or operable to support a means for transmitting UCI indicating that the UE is to skip the one or more uplink messages, where the second control signaling is the UCI.

In some examples, the DCI reception component 850 is capable of, configured to, or operable to support a means for receiving DCI indicating for the UE is to skip the one or more uplink messages, where the second control signaling is the DCI.

In some examples, the DCI reception component 850 is capable of, configured to, or operable to support a means for receiving DCI indicating for the UE to skip one or more resource occasions of a set of PDCCH resource occasions, where switching to operating in the second set of PUCCH resource occasions including the empty set is based on the DCI, and where the second control signaling is the DCI.

Figure 9:
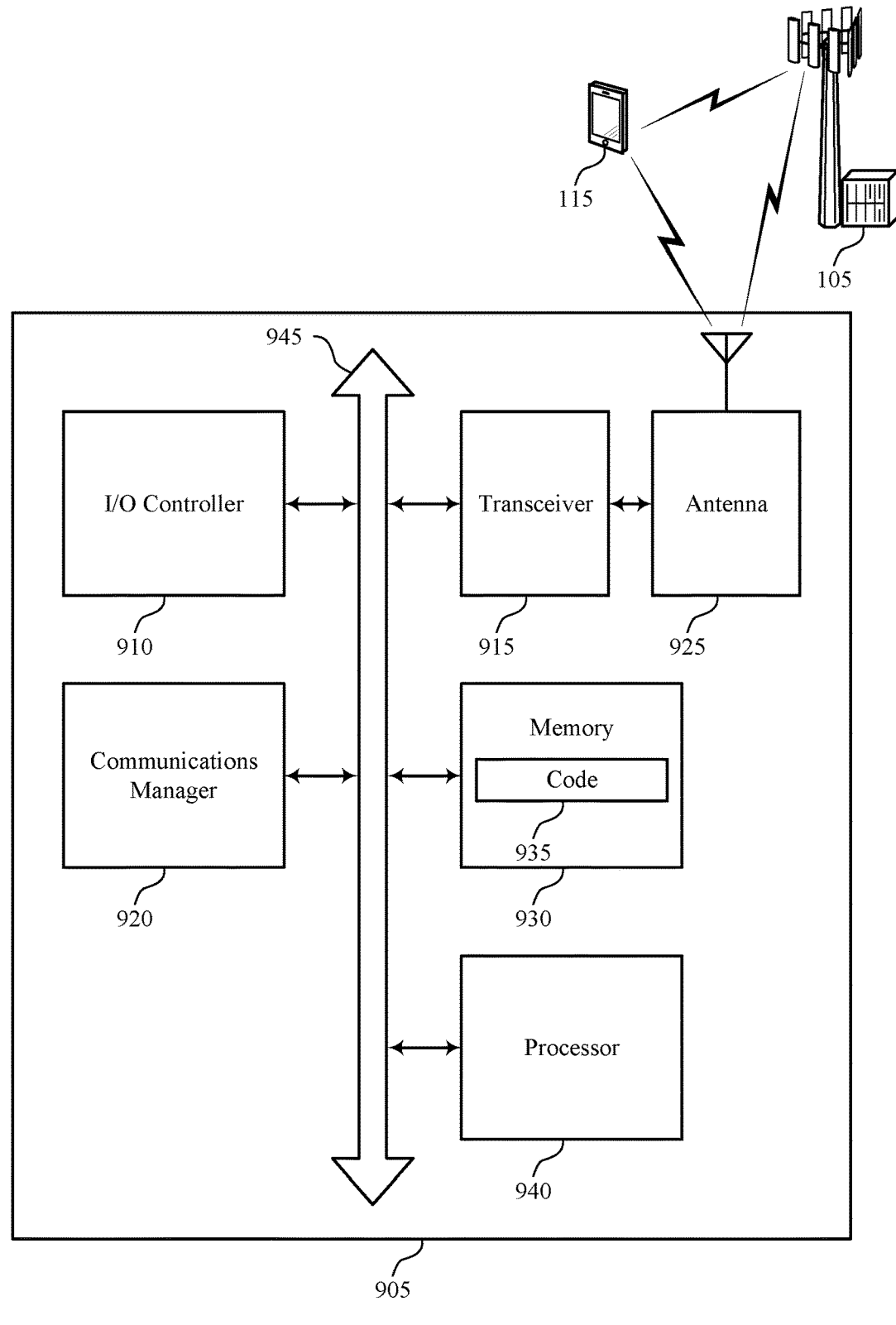
FIG. 9 shows a diagram of a system including a device that supports techniques for PUCCH adaptation in accordance with one or more aspects of the present disclosure.

FIG. 9 shows a diagram of a system 900 including a device 905 that supports techniques for PUCCH adaptation in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for PUCCH adaptation). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 is capable of, configured to, or operable to support a means for receiving first control signaling indicating at least a first set of PUCCH resource occasions and a second set of PUCCH resource occasions. The communications manager 920 is capable of, configured to, or operable to support a means for transmitting an uplink message via a first PUCCH resource occasion of the first set of PUCCH resource occasions. The communications manager 920 is capable of, configured to, or operable to support a means for switching from using resource occasions of the first set of PUCCH resource occasions to using resource occasions of the second set of PUCCH resource occasions, the switching being based on second control signaling indicating to switch from using the resource occasions of the first set of PUCCH resource occasions to using the resource occasions of the second set of PUCCH resource occasions.

By including or configuring the communications manager 920 in accordance with examples as described herein, the device 905 may support techniques for PUCCH adaptation, which may result in reduced power consumption, improved coordination between devices, and a more efficient utilization of communication resources.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for PUCCH adaptation as described herein, or the processor 940 and the memory 930 may be otherwise configured to perform or support such operations.

Figure 10:
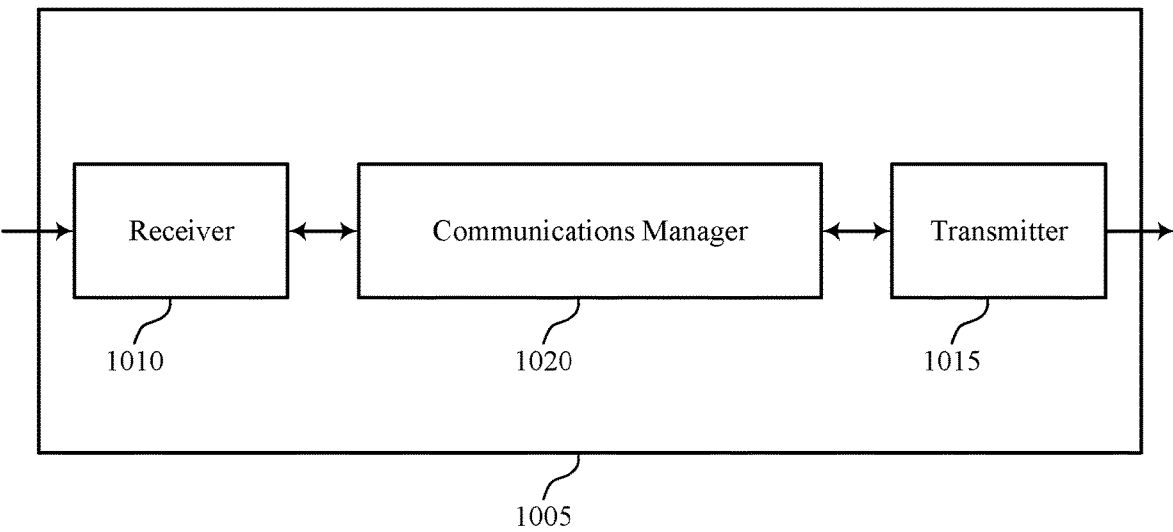
FIGS. 10 and 11 show block diagrams of devices that support techniques for PUCCH adaptation in accordance with one or more aspects of the present disclosure.
Figure 10:

FIG. 10 shows a block diagram 1000 of a device 1005 that supports techniques for PUCCH adaptation in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of techniques for PUCCH adaptation as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. For example, the communications manager 1020 is capable of, configured to, or operable to support a means for transmitting first control signaling indicating at least a first set of PUCCH resource occasions and a second set of PUCCH resource occasions. The communications manager 1020 is capable of, configured to, or operable to support a means for receiving an uplink message via a first PUCCH resource occasion of the first set of PUCCH resource occasions. The communications manager 1020 is capable of, configured to, or operable to support a means for switching from monitoring resource occasions of the first set of PUCCH resource occasions to monitoring resource occasions of the second set of PUCCH resource occasions, the switching being based on second control signaling indicating to switch from monitoring the resource occasions of the first set of PUCCH resource occasions to monitoring the resource occasions of the second set of PUCCH resource occasions.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for PUCCH adaptation, which may result in reduced power consumption and a more efficient utilization of communication resources.

Figure 11:
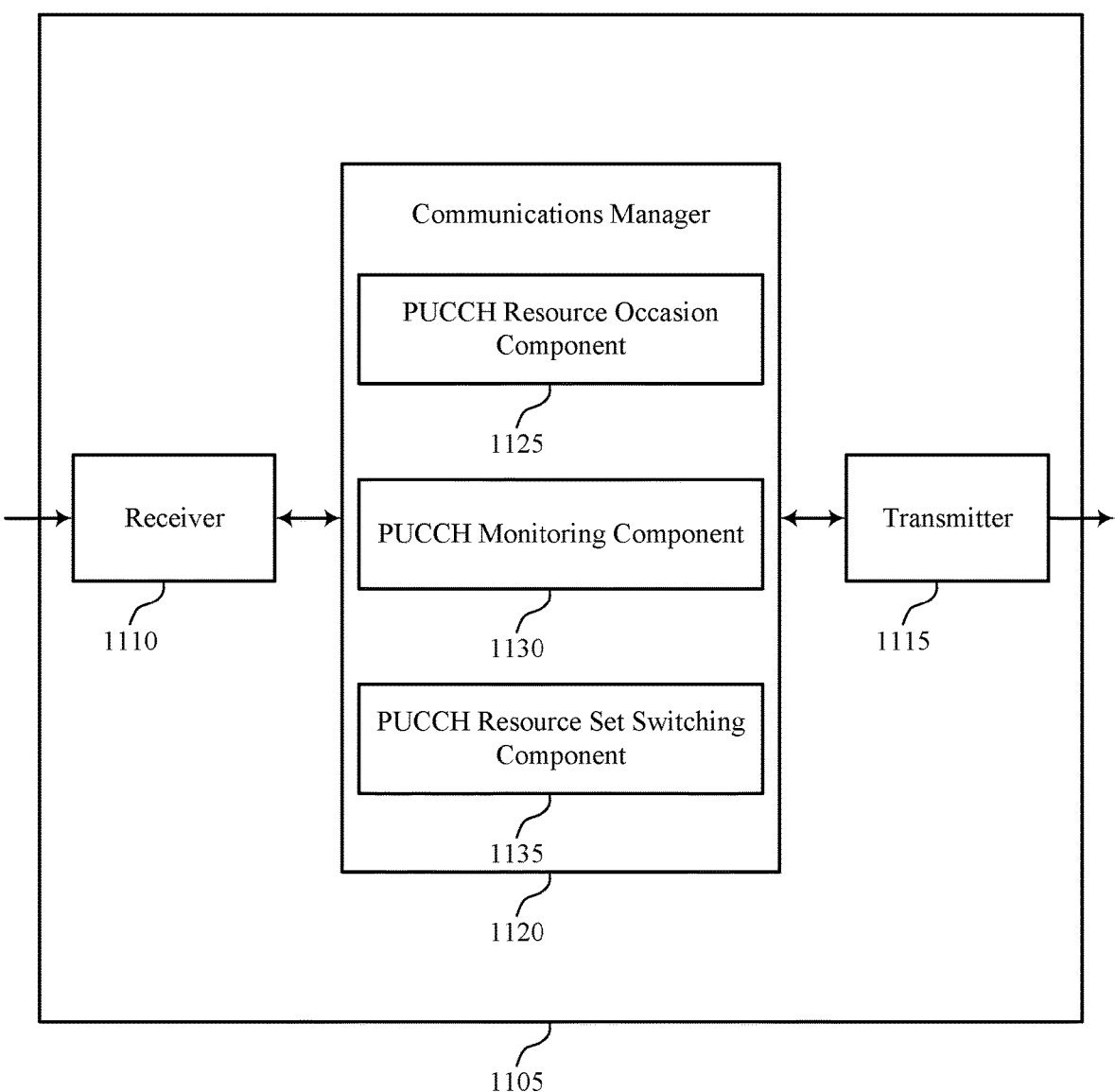

FIG. 11 shows a block diagram 1100 of a device 1105 that supports techniques for PUCCH adaptation in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for PUCCH adaptation as described herein. For example, the communications manager 1120 may include a PUCCH resource occasion component 1125, a PUCCH monitoring component 1130, a PUCCH resource set switching component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. The PUCCH resource occasion component 1125 is capable of, configured to, or operable to support a means for transmitting first control signaling indicating at least a first set of PUCCH resource occasions and a second set of PUCCH resource occasions. The PUCCH monitoring component 1130 is capable of, configured to, or operable to support a means for receiving an uplink message via a first PUCCH resource occasion of the first set of PUCCH resource occasions. The PUCCH resource set switching component 1135 is capable of, configured to, or operable to support a means for switching from monitoring resource occasions of the first set of PUCCH resource occasions to monitoring resource occasions of the second set of PUCCH resource occasions, the switching being based on second control signaling indicating to switch from monitoring the resource occasions of the first set of PUCCH resource occasions to monitoring the resource occasions of the second set of PUCCH resource occasions.

Figure 12:
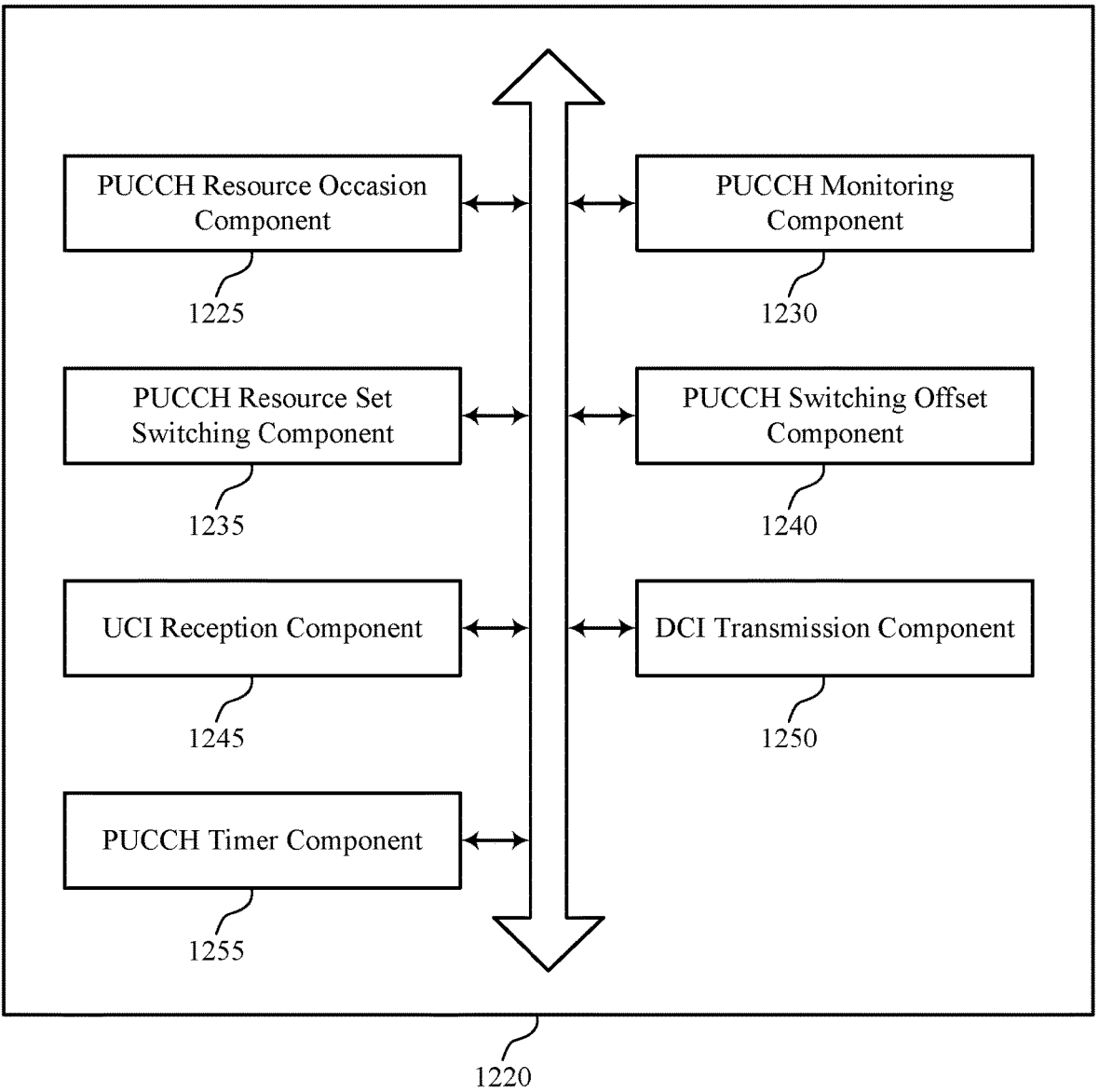
FIG. 12 shows a block diagram of a communications manager that supports techniques for PUCCH adaptation in accordance with one or more aspects of the present disclosure.

FIG. 12 shows a block diagram 1200 of a communications manager 1220 that supports techniques for PUCCH adaptation in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for PUCCH adaptation as described herein. For example, the communications manager 1220 may include a PUCCH resource occasion component 1225, a PUCCH monitoring component 1230, a PUCCH resource set switching component 1235, a PUCCH switching offset component 1240, a UCI reception component 1245, a DCI transmission component 1250, a PUCCH timer component 1255, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples as disclosed herein. The PUCCH resource occasion component 1225 is capable of, configured to, or operable to support a means for transmitting first control signaling indicating at least a first set of PUCCH resource occasions and a second set of PUCCH resource occasions. The PUCCH monitoring component 1230 is capable of, configured to, or operable to support a means for receiving an uplink message via a first PUCCH resource occasion of the first set of PUCCH resource occasions. The PUCCH resource set switching component 1235 is capable of, configured to, or operable to support a means for switching from monitoring resource occasions of the first set of PUCCH resource occasions to monitoring resource occasions of the second set of PUCCH resource occasions, the switching being based on second control signaling indicating to switch from monitoring the resource occasions of the first set of PUCCH resource occasions to monitoring the resource occasions of the second set of PUCCH resource occasions.

In some examples, the PUCCH switching offset component 1240 is capable of, configured to, or operable to support a means for receiving a second uplink message via a PUCCH resource occasion of the second set of PUCCH resource occasions in accordance with a threshold time offset between the second control signaling and monitoring the first PUCCH resource occasion for the second uplink message.

In some examples, the PUCCH timer component 1255 is capable of, configured to, or operable to support a means for resetting a duration of a timer based on reception of the second uplink message via the PUCCH resource occasion of the second set of PUCCH resource occasions, where monitoring the resource occasions of the second set of PUCCH resource occasions is for the duration of the timer.

In some examples, the PUCCH resource set switching component 1235 is capable of, configured to, or operable to support a means for switching from monitoring the resource occasions of the second set of PUCCH resource occasions to monitoring the resource occasions of the first set of PUCCH resource occasions based on expiration of a timer, third control signaling, or a combination thereof.

In some examples, switching from monitoring the resource occasions of the first set of PUCCH resource occasions to monitoring the resource occasions of the second set of PUCCH resource occasions is in response to receiving the uplink message via the first PUCCH resource occasion of the first set of PUCCH resource occasions.

In some examples, the UCI reception component 1245 is capable of, configured to, or operable to support a means for receiving UCI indicating to switch from monitoring the resource occasions of the first set of PUCCH resource occasions to monitoring the resource occasions of the second set of PUCCH resource occasions, where the second control signaling includes the UCI.

In some examples, the DCI transmission component 1250 is capable of, configured to, or operable to support a means for transmitting DCI indicating to switch from monitoring the resource occasions of the first set of PUCCH resource occasions to monitoring the resource occasions of the second set of PUCCH resource occasions, where the second control signaling includes the DCI.

In some examples, the DCI transmission component 1250 is capable of, configured to, or operable to support a means for transmitting DCI indicating to switch from monitoring resource occasions of a first set of PDCCH resource occasions to monitoring resource occasions of a second set of PDCCH resource occasions, where the switching is based on receiving the DCI, the second control signaling including the DCI.

In some examples, the second set of PUCCH resource occasions includes an empty set, and the switching is further based on the second control signaling indicating for a UE to skip one or more uplink messages.

In some examples, switching to the second set of PUCCH resource occasions including the empty set is further based on a PUCCH format associated with the one or more uplink messages.

In some examples, the second control signaling indicates a duration of a timer associated with operating in the second set of PUCCH resource occasions including the empty set, and operating in the second set of PUCCH resource occasions including the empty set is for the duration of the timer.

In some examples, switching to operating in the second set of PUCCH resource occasions including the empty set is in accordance with a threshold time offset from the second control signaling.

In some examples, the UCI reception component 1245 is capable of, configured to, or operable to support a means for receiving UCI indicating that the UE is to skip the one or more uplink messages, where the second control signaling is the UCI.

In some examples, the DCI transmission component 1250 is capable of, configured to, or operable to support a means for transmitting DCI indicating for the UE is to skip the one or more uplink messages, where the second control signaling is the DCI.

In some examples, the DCI transmission component 1250 is capable of, configured to, or operable to support a means for transmitting DCI indicating for the UE to skip one or more resource occasions of a set of PDCCH resource occasions, where switching to operating in the second set of PUCCH resource occasions including the empty set is based on the DCI, and where the second control signaling is the DCI.

Figure 13:
FIG. 13 shows a diagram of a system including a device that supports techniques for PUCCH adaptation in accordance with one or more aspects of the present disclosure.

FIG. 13 shows a diagram of a system 1300 including a device 1305 that supports techniques for PUCCH adaptation in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting techniques for PUCCH adaptation). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network entity in accordance with examples as disclosed herein. For example, the communications manager 1320 is capable of, configured to, or operable to support a means for transmitting first control signaling indicating at least a first set of PUCCH resource occasions and a second set of PUCCH resource occasions. The communications manager 1320 is capable of, configured to, or operable to support a means for receiving an uplink message via a first PUCCH resource occasion of the first set of PUCCH resource occasions. The communications manager 1320 is capable of, configured to, or operable to support a means for switching from monitoring resource occasions of the first set of PUCCH resource occasions to monitoring resource occasions of the second set of PUCCH resource occasions, the switching being based on second control signaling indicating to switch from monitoring the resource occasions of the first set of PUCCH resource occasions to monitoring the resource occasions of the second set of PUCCH resource occasions.

By including or configuring the communications manager 1320 in accordance with examples as described herein, the device 1305 may support techniques for PUCCH adaptation, which may result in reduced power consumption, improved coordination between devices, and a more efficient utilization of communication resources.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of techniques for PUCCH adaptation as described herein, or the processor 1335 and the memory 1325 may be otherwise configured to perform or support such operations.

FIG. 14 shows a flowchart illustrating a method 1400 that supports techniques for PUCCH adaptation in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the wireless UE to perform the described functions. Additionally, or alternatively, the wireless UE may perform aspects of the described functions using special-purpose hardware.

At 1405, the method may include receiving first control signaling indicating at least a first set of PUCCH resource occasions and a second set of PUCCH resource occasions. The operations of 1405 may be performed in accordance with examples as disclosed herein. In some examples, aspects of the operations of 1405 may be performed by a PUCCH Resource Set component 825 as described with reference to FIG. 8.

At 1410, the method may include transmitting an uplink message via a first PUCCH resource occasion of the first set of PUCCH resource occasions. The operations of 1410 may be performed in accordance with examples as disclosed herein. In some examples, aspects of the operations of 1410 may be performed by an uplink communications component 830 as described with reference to FIG. 8.

At 1415, the method may include switching from using resource occasions of the first set of PUCCH resource occasions to using resource occasions of the second set of PUCCH resource occasions, the switching being based on second control signaling indicating to switch from using the resource occasions of the first set of PUCCH resource occasions to using the resource occasions of the second set of PUCCH resource occasions. The operations of 1415 may be performed in accordance with examples as disclosed herein. In some examples, aspects of the operations of 1415 may be performed by a PUCCH resource set switching component 835 as described with reference to FIG. 8.

FIG. 15 shows a flowchart illustrating a method 1500 that supports techniques for PUCCH adaptation in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the wireless UE to perform the described functions. Additionally, or alternatively, the wireless UE may perform aspects of the described functions using special-purpose hardware.

At 1505, the method may include receiving first control signaling indicating at least a first set of PUCCH resource occasions and a second set of PUCCH resource occasions. The operations of 1505 may be performed in accordance with examples as disclosed herein. In some examples, aspects of the operations of 1505 may be performed by a PUCCH Resource Set component 825 as described with reference to FIG. 8.

At 1510, the method may include transmitting an uplink message via a first PUCCH resource occasion of the first set of PUCCH resource occasions. The operations of 1510 may be performed in accordance with examples as disclosed herein. In some examples, aspects of the operations of 1510 may be performed by an uplink communications component 830 as described with reference to FIG. 8.

At 1515, the method may include switching from using resource occasions of the first set of PUCCH resource occasions to using resource occasions of the second set of PUCCH resource occasions, the switching being based on second control signaling indicating to switch from using the resource occasions of the first set of PUCCH resource occasions to using the resource occasions of the second set of PUCCH resource occasions. The operations of 1515 may be performed in accordance with examples as disclosed herein. In some examples, aspects of the operations of 1515 may be performed by a PUCCH resource set switching component 835 as described with reference to FIG. 8.

At 1520, the method may include switching from using the resource occasions of the second set of PUCCH resource occasions to using the resource occasions of the first set of PUCCH resource occasions based on expiration of a timer, third control signaling, or a combination thereof. The operations of 1520 may be performed in accordance with examples as disclosed herein. In some examples, aspects of the operations of 1520 may be performed by a PUCCH resource set switching component 835 as described with reference to FIG. 8.

FIG. 16 shows a flowchart illustrating a method 1600 that supports techniques for PUCCH adaptation in accordance with aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the wireless network entity to perform the described functions. Additionally, or alternatively, the wireless network entity may perform aspects of the described functions using special-purpose hardware.

At 1605, the method may include transmitting first control signaling indicating at least a first set of PUCCH resource occasions and a second set of PUCCH resource occasions. The operations of 1605 may be performed in accordance with examples as disclosed herein. In some examples, aspects of the operations of 1605 may be performed by a PUCCH resource occasion component 1225 as described with reference to FIG. 12.

At 1610, the method may include receiving an uplink message via a first PUCCH resource occasion of the first set of PUCCH resource occasions. The operations of 1610 may be performed in accordance with examples as disclosed herein. In some examples, aspects of the operations of 1610 may be performed by a PUCCH monitoring component 1230 as described with reference to FIG. 12.

At 1615, the method may include switching from monitoring resource occasions of the first set of PUCCH resource occasions to monitoring resource occasions of the second set of PUCCH resource occasions, the switching being based on second control signaling indicating to switch from monitoring the resource occasions of the first set of PUCCH resource occasions to monitoring the resource occasions of the second set of PUCCH resource occasions. The operations of 1615 may be performed in accordance with examples as disclosed herein. In some examples, aspects of the operations of 1615 may be performed by a PUCCH resource set switching component 1235 as described with reference to FIG. 12.

FIG. 17 shows a flowchart illustrating a method 1700 that supports techniques for PUCCH adaptation in accordance with aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the wireless network entity to perform the described functions. Additionally, or alternatively, the wireless network entity may perform aspects of the described functions using special-purpose hardware.

At 1705, the method may include transmitting first control signaling indicating at least a first set of PUCCH resource occasions and a second set of PUCCH resource occasions. The operations of 1705 may be performed in accordance with examples as disclosed herein. In some examples, aspects of the operations of 1705 may be performed by a PUCCH resource occasion component 1225 as described with reference to FIG. 12.

At 1710, the method may include receiving an uplink message via a first PUCCH resource occasion of the first set of PUCCH resource occasions. The operations of 1710 may be performed in accordance with examples as disclosed herein. In some examples, aspects of the operations of 1710 may be performed by a PUCCH monitoring component 1230 as described with reference to FIG. 12.

At 1715, the method may include switching from monitoring resource occasions of the first set of PUCCH resource occasions to monitoring resource occasions of the second set of PUCCH resource occasions, the switching being based on second control signaling indicating to switch from monitoring the resource occasions of the first set of PUCCH resource occasions to monitoring the resource occasions of the second set of PUCCH resource occasions. The operations of 1715 may be performed in accordance with examples as disclosed herein. In some examples, aspects of the operations of 1715 may be performed by a PUCCH resource set switching component 1235 as described with reference to FIG. 12.

At 1720, the method may include switching from monitoring the resource occasions of the second set of PUCCH resource occasions to monitoring the resource occasions of the first set of PUCCH resource occasions based on expiration of a timer, third control signaling, or a combination thereof. The operations of 1720 may be performed in accordance with examples as disclosed herein. In some examples, aspects of the operations of 1720 may be performed by a PUCCH resource set switching component 1235 as described with reference to FIG. 12.

The following provides an overview of aspects of the present disclosure:

Aspect 1: A method for wireless communications at a UE, comprising: receiving first control signaling indicating at least a first set of PUCCH resource occasions and a second set of PUCCH resource occasions; transmitting an uplink message via a first PUCCH resource occasion of the first set of PUCCH resource occasions; and switching from using resource occasions of the first set of PUCCH resource occasions to using resource occasions of the second set of PUCCH resource occasions, the switching being based at least in part on second control signaling indicating to switch from using the resource occasions of the first set of PUCCH resource occasions to using the resource occasions of the second set of PUCCH resource occasions.

Aspect 2: The method of aspect 1, further comprising: transmitting a second uplink message via a PUCCH resource occasion of the second set of PUCCH resource occasions in accordance with a threshold time offset between the second control signaling and transmitting the second uplink message.

Aspect 3: The method of aspect 2, further comprising: resetting a duration of a timer based at least in part on transmission of the second uplink message via the PUCCH resource occasion of the second set of PUCCH resource occasions, wherein using the resource occasions of the second set of PUCCH resource occasions is for the duration of the timer.

Aspect 4: The method of any of aspects 1 through 3, further comprising: switching from using the resource occasions of the second set of PUCCH resource occasions to using the resource occasions of the first set of PUCCH resource occasions based at least in part on expiration of a timer, third control signaling, or a combination thereof.

Aspect 5: The method of any of aspects 1 through 4, wherein switching from using the resource occasions of the first set of PUCCH resource occasions to using the resource occasions of the second set of PUCCH resource occasions is in response to transmitting the uplink message via the first PUCCH resource occasion of the first set of PUCCH resource occasions.

Aspect 6: The method of any of aspects 1 through 5, further comprising: transmitting UCI indicating to switch from using the resource occasions of the first set of PUCCH resource occasions to using the resource occasions of the second set of PUCCH resource occasions, wherein the second control signaling includes the UCI.

Aspect 7: The method of any of aspects 1 through 6, further comprising: receiving DCI indicating to switch from using the resource occasions of the first set of PUCCH resource occasions to using the resource occasions of the second set of PUCCH resource occasions, wherein the second control signaling includes the DCI.

Aspect 8: The method of any of aspects 1 through 7, further comprising: receiving DCI indicating to switch from using resource occasions of a first set of PDCCH resource occasions to using resource occasions of a second set of PDCCH resource occasions, wherein the switching is based at least in part on receiving the DCI, the second control signaling including the DCI.

Aspect 9: The method of aspect 1, wherein the second set of PUCCH resource occasions comprises an empty set, and the switching is further based at least in part on the second control signaling indicating for the UE to skip one or more uplink messages.

Aspect 10: The method of aspect 9, wherein switching to the second set of PUCCH resource occasions comprising the empty set is further based at least in part on a PUCCH format of the one or more uplink messages.

Aspect 11: The method of any of aspects 9 through 10, wherein the second control signaling indicates a duration of a timer associated with operating in the second set of PUCCH resource occasions comprising the empty set, and operating in the second set of PUCCH resource occasions comprising the empty set is for the duration of the timer.

Aspect 12: The method of any of aspects 9 through 11, wherein switching to operating in the second set of PUCCH resource occasions comprising the empty set is in accordance with a threshold time offset from the second control signaling.

Aspect 13: The method of any of aspects 9 through 12, further comprising: transmitting UCI indicating that the UE is to skip the one or more uplink messages, wherein the second control signaling is the UCI.

Aspect 14: The method of any of aspects 9 through 13, further comprising: receiving DCI indicating for the UE is to skip the one or more uplink messages, wherein the second control signaling is the DCI.

Aspect 15: The method of any of aspects 9 through 14, further comprising: receiving DCI indicating for the UE to skip one or more resource occasions of a set of PDCCH resource occasions, wherein switching to operating in the second set of PUCCH resource occasions comprising the empty set is based at least in part on the DCI, and wherein the second control signaling is the DCI.

Aspect 16: A method for wireless communications at a network entity, comprising: transmitting first control signaling indicating at least a first set of PUCCH resource occasions and a second set of PUCCH resource occasions; receiving an uplink message via a first PUCCH resource occasion of the first set of PUCCH resource occasions; and switching from monitoring resource occasions of the first set of PUCCH resource occasions to monitoring resource occasions of the second set of PUCCH resource occasions, the switching being based at least in part on second control signaling indicating to switch from monitoring the resource occasions of the first set of PUCCH resource occasions to monitoring the resource occasions of the second set of PUCCH resource occasions.

Aspect 17: The method of aspect 16, further comprising: receiving a second uplink message via a PUCCH resource occasion of the second set of PUCCH resource occasions in accordance with a threshold time offset between the second control signaling and monitoring the first PUCCH resource occasion for the second uplink message.

Aspect 18: The method of aspect 17, further comprising: resetting a duration of a timer based at least in part on reception of the second uplink message via the PUCCH resource occasion of the second set of PUCCH resource occasions, wherein monitoring the resource occasions of the second set of PUCCH resource occasions is for the duration of the timer.

Aspect 19: The method of any of aspects 16 through 18, further comprising: switching from monitoring the resource occasions of the second set of PUCCH resource occasions to monitoring the resource occasions of the first set of PUCCH resource occasions based at least in part on expiration of a timer, third control signaling, or a combination thereof.

Aspect 20: The method of any of aspects 16 through 19, wherein switching from monitoring the resource occasions of the first set of PUCCH resource occasions to monitoring the resource occasions of the second set of PUCCH resource occasions is in response to receiving the uplink message via the first PUCCH resource occasion of the first set of PUCCH resource occasions.

Aspect 21: The method of any of aspects 16 through 20, further comprising: receiving UCI indicating to switch from monitoring the resource occasions of the first set of PUCCH resource occasions to monitoring the resource occasions of the second set of PUCCH resource occasions, wherein the second control signaling includes the UCI.

Aspect 22: The method of any of aspects 16 through 21, further comprising: transmitting DCI indicating to switch from monitoring the resource occasions of the first set of PUCCH resource occasions to monitoring the resource occasions of the second set of PUCCH resource occasions, wherein the second control signaling includes the DCI.

Aspect 23: The method of any of aspects 16 through 22, further comprising: transmitting DCI indicating to switch from monitoring resource occasions of a first set of PDCCH resource occasions to monitoring resource occasions of a second set of PDCCH resource occasions, wherein the switching is based at least in part on receiving the DCI, the second control signaling including the DCI.

Aspect 24: The method of aspect 16, wherein the second set of PUCCH resource occasions comprises an empty set, and the switching is further based at least in part on the second control signaling indicating for a UE to skip one or more uplink messages.

Aspect 25: The method of aspect 24, wherein switching to the second set of PUCCH resource occasions comprising the empty set is further based at least in part on a PUCCH format associated with the one or more uplink messages.

Aspect 26: The method of any of aspects 24 through 25, wherein the second control signaling indicates a duration of a timer associated with operating in the second set of PUCCH resource occasions comprising the empty set, and operating in the second set of PUCCH resource occasions comprising the empty set is for the duration of the timer.

Aspect 27: The method of any of aspects 24 through 26, wherein switching to operating in the second set of PUCCH resource occasions comprising the empty set is in accordance with a threshold time offset from the second control signaling.

Aspect 28: The method of any of aspects 24 through 27, further comprising: receiving UCI indicating that the UE is to skip the one or more uplink messages, wherein the second control signaling is the UCI.

Aspect 29: The method of any of aspects 24 through 28, further comprising: transmitting DCI indicating for the UE is to skip the one or more uplink messages, wherein the second control signaling is the DCI.

Aspect 30: The method of any of aspects 24 through 29, further comprising: transmitting DCI indicating for the UE to skip one or more resource occasions of a set of PDCCH resource occasions, wherein switching to operating in the second set of PUCCH resource occasions comprising the empty set is based at least in part on the DCI, and wherein the second control signaling is the DCI.

Aspect 31: An apparatus for wireless communications at a UE, comprising a processor; memory coupled with the processor; and instructions stored in the memory and executable by the processor to cause the apparatus to perform a method of any of aspects 1 through 15.

Aspect 32: An apparatus for wireless communications at a UE, comprising at least one means for performing a method of any of aspects 1 through 15.

Aspect 33: A non-transitory computer-readable medium storing code for wireless communications at a UE, the code comprising instructions executable by a processor to perform a method of any of aspects 1 through 15.

Aspect 34: An apparatus for wireless communications at a network entity, comprising a processor; memory coupled with the processor; and instructions stored in the memory and executable by the processor to cause the apparatus to perform a method of any of aspects 16 through 30.

Aspect 35: An apparatus for wireless communications at a network entity, comprising at least one means for performing a method of any of aspects 16 through 30.

Aspect 36: A non-transitory computer-readable medium storing code for wireless communications at a network entity, the code comprising instructions executable by a processor to perform a method of any of aspects 16 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving first control signaling indicating at least a first set of physical uplink control channel resource occasions and a second set of physical uplink control channel resource occasions;

transmitting a first uplink message via a first physical uplink control channel resource occasion of the first set of physical uplink control channel resource occasions;

switching from using resource occasions of the first set of physical uplink control channel resource occasions to using resource occasions of the second set of physical uplink control channel resource occasions, the switching being based at least in part on second control signaling indicating to switch from using the resource occasions of the first set of physical uplink control channel resource occasions to using the resource occasions of the second set of physical uplink control channel resource occasions;

transmitting a second uplink message via a second physical uplink control channel resource occasion of the second set of physical uplink control channel resource occasions, wherein transmitting the second uplink message is after a threshold time offset from the second control signaling; and resetting a duration of a timer based at least in part on transmission of the second uplink message via the second physical uplink control channel resource occasion of the second set of physical uplink control channel resource occasions, wherein using the resource occasions of the second set of physical uplink control channel resource occasions is for the duration of the timer.

2. The method of claim 1, further comprising:

switching from using the resource occasions of the second set of physical uplink control channel resource occasions to using the resource occasions of the first set of physical uplink control channel resource occasions based at least in part on expiration of the timer, third control signaling, or a combination thereof.

3. The method of claim 1, wherein switching from using the resource occasions of the first set of physical uplink control channel resource occasions to using the resource occasions of the second set of physical uplink control channel resource occasions is in response to transmitting the first uplink message via the first physical uplink control channel resource occasion of the first set of physical uplink control channel resource occasions.

4. The method of claim 1, further comprising:

transmitting uplink control information indicating to switch from using the resource occasions of the first set of physical uplink control channel resource occasions to using the resource occasions of the second set of physical uplink control channel resource occasions, wherein the second control signaling includes the uplink control information.

5. The method of claim 1, further comprising:

receiving downlink control information indicating to switch from using the resource occasions of the first set of physical uplink control channel resource occasions to using the resource occasions of the second set of physical uplink control channel resource occasions, wherein the second control signaling includes the downlink control information.

6. The method of claim 1, further comprising:

receiving downlink control information indicating to switch from using resource occasions of a first set of physical downlink control channel resource occasions to using resource occasions of a second set of physical downlink control channel resource occasions, wherein the switching is based at least in part on receiving the downlink control information, the second control signaling including the downlink control information.

7. The method of claim 1, further comprising:

receiving, via the first control signaling, a third set of physical uplink control channel resource occasions, wherein the third set of physical uplink control channel resource occasions comprises an empty set; and switching from using the resource occasions of the second set of physical uplink control channel resource occasions to using resource occasions of the third set of physical uplink control channel resource occasions, the switching being based at least in part on third control signaling indicating to switch from using the resource occasions of the second set of physical uplink control channel resource occasions to using the resource occasions of the third set of physical uplink control channel resource occasions, wherein the switching is further based at least in part on the third control signaling indicating for the UE to skip one or more uplink messages.

8. The method of claim 7, wherein switching to the third set of physical uplink control channel resource occasions comprising the empty set is further based at least in part on a physical uplink control channel format of the one or more uplink messages.

9. The method of claim 7, wherein the third control signaling indicates a duration of a second timer associated with operating in the third set of physical uplink control channel resource occasions comprising the empty set, and operating in the third set of physical uplink control channel resource occasions comprising the empty set is for the duration of the second timer.

10. The method of claim 7, wherein switching to operating in the third set of physical uplink control channel resource occasions comprising the empty set is in accordance with a threshold time offset from the third control signaling.

11. The method of claim 9, further comprising:

transmitting uplink control information indicating that the UE is to skip the one or more uplink messages, wherein the third control signaling is the uplink control information.

12. The method of claim 7, further comprising:

receiving downlink control information indicating that the UE is to skip the one or more uplink messages, wherein the third control signaling is the downlink control information.

13. The method of claim 7, further comprising:

receiving downlink control information indicating for the UE to skip one or more resource occasions of a set of physical downlink control channel resource occasions, wherein switching to operating in the third set of physical uplink control channel resource occasions comprising the empty set is based at least in part on the downlink control information, and wherein the third control signaling is the downlink control information.

14. A method for wireless communications at a network entity, comprising:

transmitting first control signaling indicating at least a first set of physical uplink control channel resource occasions and a second set of physical uplink control channel resource occasions;

receiving a first uplink message via a first physical uplink control channel resource occasion of the first set of physical uplink control channel resource occasions;

switching from monitoring resource occasions of the first set of physical uplink control channel resource occasions to monitoring resource occasions of the second set of physical uplink control channel resource occasions, the switching being based at least in part on second control signaling indicating to switch from monitoring the resource occasions of the first set of physical uplink control channel resource occasions to monitoring the resource occasions of the second set of physical uplink control channel resource occasions;

receiving a second uplink message via a second physical uplink control channel resource occasion of the second set of physical uplink control channel resource occasions, wherein receiving the second uplink message is after a threshold time offset from the second control signaling to monitoring the first physical uplink control channel resource occasion for the second uplink message; and resetting a duration of a timer based at least in part on reception of the second uplink message via the second physical uplink control channel resource occasion of the second set of physical uplink control channel resource occasions, wherein monitoring the resource occasions of the second set of physical uplink control channel resource occasions is for the duration of the timer.

15. The method of claim 14, further comprising:

switching from monitoring the resource occasions of the second set of physical uplink control channel resource occasions to monitoring the resource occasions of the first set of physical uplink control channel resource occasions based at least in part on expiration of the timer, third control signaling, or a combination thereof.

16. The method of claim 14, wherein switching from monitoring the resource occasions of the first set of physical uplink control channel resource occasions to monitoring the resource occasions of the second set of physical uplink control channel resource occasions is in response to receiving the first uplink message via the first physical uplink control channel resource occasion of the first set of physical uplink control channel resource occasions.

17. The method of claim 14, further comprising:

receiving uplink control information indicating to switch from monitoring the resource occasions of the first set of physical uplink control channel resource occasions to monitoring the resource occasions of the second set of physical uplink control channel resource occasions, wherein the second control signaling includes the uplink control information.

18. The method of claim 14, further comprising:

transmitting downlink control information indicating to switch from monitoring the resource occasions of the first set of physical uplink control channel resource occasions to monitoring the resource occasions of the second set of physical uplink control channel resource occasions, wherein the second control signaling includes the downlink control information.

19. The method of claim 14, further comprising:

transmitting downlink control information indicating to switch from monitoring resource occasions of a first set of physical downlink control channel resource occasions to monitoring resource occasions of a second set of physical downlink control channel resource occasions, wherein the switching is based at least in part on receiving the downlink control information, the second control signaling including the downlink control information.

20. The method of claim 14, further comprising:

transmitting, via the first control signaling, a third set of physical uplink control channel resource occasions, wherein the third set of physical uplink control channel resource occasions comprises an empty set; and switching from monitoring the resource occasions of the second set of physical uplink control channel resource occasions to monitoring resource occasions of the third set of physical uplink control channel resource occasions, the switching being based at least in part on third control signaling indicating to switch from monitoring the resource occasions of the second set of physical uplink control channel resource occasions to monitoring the resource occasions of the third set of physical uplink control channel resource occasions, wherein the switching is further based at least in part on the third control signaling indicating for a user equipment (UE) to skip one or more uplink messages.

21. An apparatus for wireless communications at a user equipment (UE), comprising:

one or more processors;

one or more memories coupled with the one or more processors; and instructions stored in the one or more memories and executable by the one or more processors to cause the apparatus to:

receive first control signaling indicating at least a first set of physical uplink control channel resource occasions and a second set of physical uplink control channel resource occasions;

transmit a first uplink message via a first physical uplink control channel resource occasion of the first set of physical uplink control channel resource occasions;

switch from using resource occasions of the first set of physical uplink control channel resource occasions to using resource occasions of the second set of physical uplink control channel resource occasions, the switching being based at least in part on second control signaling indicating to switch from using the resource occasions of the first set of physical uplink control channel resource occasions to using the resource occasions of the second set of physical uplink control channel resource occasions;

transmit a second uplink message via a second physical uplink control channel resource occasion of the second set of physical uplink control channel resource occasions, wherein transmitting the second uplink message is after a threshold time offset from the second control signaling; and reset a duration of a timer based at least in part on transmission of the second uplink message via the second physical uplink control channel resource occasion of the second set of physical uplink control channel resource occasions, wherein using the resource occasions of the second set of physical uplink control channel resource occasions is for the duration of the timer.

22. An apparatus for wireless communications at a network entity, comprising:

one or more processors;

one or more memories coupled with the processor one or more processors; and instructions stored in the one or more memories and executable by the one or more processors to cause the apparatus to:

transmit first control signaling indicating at least a first set of physical uplink control channel resource occasions and a second set of physical uplink control channel resource occasions;

receive a first uplink message via a first physical uplink control channel resource occasion of the first set of physical uplink control channel resource occasions;

switch from monitoring resource occasions of the first set of physical uplink control channel resource occasions to monitoring resource occasions of the second set of physical uplink control channel resource occasions, the switching being based at least in part on second control signaling indicating to switch from monitoring the resource occasions of the first set of physical uplink control channel resource occasions to monitoring the resource occasions of the second set of physical uplink control channel resource occasions;

receive a second uplink message via a second physical uplink control channel resource occasion of the second set of physical uplink control channel resource occasions, wherein receiving the second uplink message is after a threshold time offset from the second control signaling to monitoring the first physical uplink control channel resource occasion for the second uplink message; and reset a duration of a timer based at least in part on reception of the second uplink message via the second physical uplink control channel resource occasion of the second set of physical uplink control channel resource occasions, wherein monitoring the resource occasions of the second set of physical uplink control channel resource occasions is for the duration of the timer.

* * * * *